(12) United States Patent
Grabon

(10) Patent No.: US 11,944,170 B2
(45) Date of Patent: Apr. 2, 2024

(54) AIR COOLING UNIT

(71) Applicants: Carrier Corporation, Palm Beach Gardens, FL (US); Michel Grabon, Montluel (FR)

(72) Inventor: Michel Grabon, Bressolles (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 806 days.

(21) Appl. No.: 16/965,722

(22) PCT Filed: Feb. 2, 2018

(86) PCT No.: PCT/IB2018/000165
§ 371 (c)(1),
(2) Date: Jul. 29, 2020

(87) PCT Pub. No.: WO2019/150154
PCT Pub. Date: Aug. 8, 2019

(65) Prior Publication Data
US 2021/0030126 A1    Feb. 4, 2021

(51) Int. Cl.
*F24F 5/00* (2006.01)
*A45B 23/00* (2006.01)
*F24F 13/02* (2006.01)

(52) U.S. Cl.
CPC ............ *A45B 23/00* (2013.01); *F24F 5/0035* (2013.01); *F24F 13/0236* (2013.01); *A45B 2200/1036* (2013.01)

(58) Field of Classification Search
CPC ............................................. A45B 2200/1036
See application file for complete search history.

(56) References Cited

U.S. PATENT DOCUMENTS

| 1,092,243 A | 4/1914 | Cole |
| 1,831,825 A | 11/1931 | Schutz |
| (Continued) | | |

FOREIGN PATENT DOCUMENTS

| CN | 201480241 U | 5/2010 |
| CN | 102793345 A | 11/2012 |
| (Continued) | | |

OTHER PUBLICATIONS

International Search Report for International Application No. PCT/IB2018/000165, International Filing Date Feb. 2, 2018, dated Oct. 24, 2018, 6 pages.

(Continued)

*Primary Examiner* — Nelson J Nieves
(74) *Attorney, Agent, or Firm* — CANTOR COLBURN LLP

(57) ABSTRACT

Cooling units are provided. The cooling units include a base having a housing with control components and a cooling tower attached to the base having an inner flow path and an exterior surface. An air distribution system is attached to the cooling tower and includes an air distribution chamber defined between first and second enclosures, a cool air dispenser configured in the first enclosure, a warm air dispenser configured in the first enclosure at a location different from the cool air dispenser, and a cover disposed on an exterior surface of the second enclosure. The control components are configured to convey air through the base, the cooling tower, and the air distribution system to dispense air through the cool air dispenser and the warm air dispenser and a plurality of ducts connect the cooling tower to at least one of the cool air dispenser and the warm air dispenser.

15 Claims, 13 Drawing Sheets

(56) References Cited

U.S. PATENT DOCUMENTS

| | | | |
|---|---|---|---|
| 2,210,458 A | 8/1940 | Keilholtz | |
| 2,727,366 A | 12/1955 | Hagen | |
| 3,208,236 A | 9/1965 | Frigerio | |
| 3,228,317 A | 1/1966 | Westman | |
| 3,247,895 A | 4/1966 | Phillips, Jr. | |
| 3,444,799 A | 5/1969 | Covington | |
| 4,002,333 A | 1/1977 | Gotoh | |
| 4,403,732 A | 9/1983 | Primich | |
| 4,658,600 A | 4/1987 | Kelley | |
| 4,765,542 A | 8/1988 | Carlson | |
| 4,899,027 A | 2/1990 | Wong | |
| 5,094,273 A | 3/1992 | Eagleton | |
| 5,137,214 A | 8/1992 | Mallery | |
| 5,180,332 A | 1/1993 | Mitchell et al. | |
| 5,194,048 A | 3/1993 | Briggs | |
| 5,207,238 A * | 5/1993 | Rivera | A45B 3/00 135/31 |
| 5,230,720 A | 7/1993 | Kendall | |
| 5,263,897 A | 11/1993 | Kondo et al. | |
| 5,349,975 A | 9/1994 | Valdner | |
| 5,350,337 A | 9/1994 | Kondo et al. | |
| 5,497,633 A | 3/1996 | Jones et al. | |
| 5,503,597 A | 4/1996 | Lochtefeld et al. | |
| 5,979,793 A | 11/1999 | Louis | |
| 6,017,188 A | 1/2000 | Benton | |
| 6,036,603 A | 3/2000 | Mason et al. | |
| 6,151,907 A | 11/2000 | Hale | |
| 6,158,669 A | 12/2000 | Louis | |
| 6,175,969 B1 | 1/2001 | Edwards | |
| 6,298,866 B1 | 10/2001 | Molnar, IV | |
| 6,675,739 B2 | 1/2004 | Terrell et al. | |
| 6,682,000 B1 | 1/2004 | Apple | |
| 6,886,759 B1 | 5/2005 | Okronick et al. | |
| 6,945,868 B2 | 9/2005 | Gautney | |
| 7,104,270 B2 | 9/2006 | Dong | |
| 7,234,653 B2 | 6/2007 | Powell et al. | |
| 7,322,208 B1 | 1/2008 | Griffin | |
| 7,418,832 B2 | 9/2008 | Ferrono et al. | |
| 7,431,469 B2 | 10/2008 | Li | |
| 7,497,225 B1 | 3/2009 | Klein, Jr. et al. | |
| 7,513,126 B2 | 4/2009 | Boland | |
| 7,537,015 B1 | 5/2009 | Molnar, IV et al. | |
| 7,665,477 B1 | 2/2010 | Hathaway | |
| 7,871,017 B2 | 1/2011 | Van Zutven | |
| 7,950,406 B2 | 5/2011 | Raniere | |
| 7,997,561 B2 | 8/2011 | Goldmann et al. | |
| 8,061,374 B2 | 11/2011 | Li | |
| 8,267,104 B2 | 9/2012 | Li | |
| 8,497,656 B2 | 7/2013 | Portis, Jr. et al. | |
| 8,695,614 B2 | 4/2014 | Chaimovski et al. | |
| 8,727,555 B2 | 5/2014 | Kuelbs | |
| 8,753,216 B2 | 6/2014 | Hsieh | |
| 8,899,495 B2 | 12/2014 | Chuang | |
| 9,010,346 B2 | 4/2015 | Stankiewicz | |
| 9,125,462 B2 | 9/2015 | Akin et al. | |
| 9,345,295 B2 | 5/2016 | Li | |
| 9,488,164 B2 | 11/2016 | Osborn | |
| 9,645,611 B2 | 5/2017 | Chen | |
| 9,750,318 B2 | 9/2017 | Rao | |
| 9,820,540 B2 | 11/2017 | Pan et al. | |
| 9,839,267 B1 | 12/2017 | Gharabegian | |
| 9,859,748 B2 | 1/2018 | Wang et al. | |
| 10,939,735 B2 | 3/2021 | Grabon et al. | |
| 2004/0221882 A1 | 11/2004 | Watson et al. | |
| 2005/0161067 A1 | 7/2005 | Hollins | |
| 2005/0172987 A1 | 8/2005 | Byrnes | |
| 2005/0247074 A1 * | 11/2005 | Ellicott | F24F 1/022 62/419 |
| 2006/0091234 A1 | 5/2006 | Wallander | |
| 2006/0162368 A1 | 7/2006 | Boland | |
| 2007/0092375 A1 | 4/2007 | Liu | |
| 2007/0132116 A1 | 6/2007 | Mockry et al. | |
| 2008/0006263 A1 | 1/2008 | Seichei et al. | |
| 2008/0048051 A1 | 2/2008 | Chang | |
| 2008/0056898 A1 | 3/2008 | Li | |
| 2008/0179426 A1 | 7/2008 | Johnson | |
| 2009/0283606 A1 | 11/2009 | Terrell et al. | |
| 2009/0314216 A1 | 12/2009 | Polak et al. | |
| 2010/0024856 A1 | 2/2010 | Li | |
| 2011/0146319 A1 | 6/2011 | Branning | |
| 2011/0146542 A1 | 6/2011 | Branning | |
| 2012/0028562 A1 | 2/2012 | Heim et al. | |
| 2012/0032125 A1 | 4/2012 | Bin | |
| 2013/0037254 A1 | 2/2013 | Carlson et al. | |
| 2013/0075066 A1 | 3/2013 | Reytblat | |
| 2014/0048110 A1 | 2/2014 | Stankiewicz | |
| 2014/0075959 A1 | 3/2014 | Lenkszus et al. | |
| 2014/0109610 A1 | 4/2014 | Wulf et al. | |
| 2015/0366305 A1 | 12/2015 | Edwards | |
| 2016/0085248 A1 | 3/2016 | Gordon et al. | |
| 2016/0119699 A1 | 4/2016 | Caban | |
| 2016/0123335 A1 | 5/2016 | Molnar, IV et al. | |
| 2016/0310926 A1 | 10/2016 | Sun et al. | |
| 2016/0326765 A1 | 11/2016 | Barbret | |
| 2016/0338457 A1 | 11/2016 | Gharabegian | |
| 2016/0340926 A1 | 11/2016 | Barbret | |
| 2016/0377306 A1 | 12/2016 | Drees et al. | |
| 2017/0105497 A1 | 4/2017 | Gharabegian | |
| 2017/0138650 A1 | 5/2017 | Eiserer | |
| 2017/0167738 A1 | 6/2017 | Stein | |
| 2017/0318923 A1 | 11/2017 | Gharabegian | |
| 2017/0332750 A1 | 11/2017 | Gharabegian | |
| 2018/0163982 A1 | 6/2018 | Van Der Lee | |
| 2018/0283814 A1 | 10/2018 | Najafifard | |
| 2019/0186763 A1 | 6/2019 | Reinders et al. | |
| 2019/0254394 A1 | 8/2019 | Grabon et al. | |
| 2020/0191418 A1 | 6/2020 | Weeber | |

FOREIGN PATENT DOCUMENTS

| | | |
|---|---|---|
| CN | 102896057 A | 1/2013 |
| CN | 203105923 U | 8/2013 |
| CN | 103438525 A | 12/2013 |
| CN | 203664101 U | 6/2014 |
| CN | 103948224 A | 7/2014 |
| CN | 203762442 U | 8/2014 |
| CN | 203776282 U | 8/2014 |
| CN | 203873149 U | 10/2014 |
| CN | 204070887 U | 1/2015 |
| CN | 204079525 U | 1/2015 |
| CN | 104886895 A | 9/2015 |
| CN | 204742896 U | 11/2015 |
| CN | 205040822 U | 2/2016 |
| CN | 105394898 A | 3/2016 |
| CN | 205072237 U | 3/2016 |
| CN | 105476204 A | 4/2016 |
| CN | 105484526 A | 4/2016 |
| CN | 205125314 U | 4/2016 |
| CN | 205154696 U | 4/2016 |
| CN | 105581464 A | 5/2016 |
| CN | 205267237 U | 6/2016 |
| CN | 205285314 U | 6/2016 |
| CN | 105725400 A | 7/2016 |
| CN | 105864928 A | 8/2016 |
| CN | 205410042 U | 8/2016 |
| CN | 205512869 U | 8/2016 |
| CN | 205568097 U | 9/2016 |
| CN | 205649066 U | 10/2016 |
| CN | 205649068 U | 10/2016 |
| CN | 205716814 U | 11/2016 |
| CN | 205757722 U | 12/2016 |
| CN | 205831283 U | 12/2016 |
| CN | 206137411 U | 5/2017 |
| CN | 106820504 A | 6/2017 |
| CN | 106931572 A | 7/2017 |
| CN | 206314686 U | 7/2017 |
| CN | 107048634 A | 8/2017 |
| CN | 107212537 A | 9/2017 |
| CN | 206586516 U | 10/2017 |
| CN | 107341929 A | 11/2017 |
| CN | 206675136 U | 11/2017 |
| CN | 206675145 U | 11/2017 |
| CN | 206699603 U | 12/2017 |
| DE | 19738267 A1 | 4/1998 |

(56) References Cited

FOREIGN PATENT DOCUMENTS

| | | |
|---|---|---|
| DE | 202006002144 U1 | 4/2006 |
| DE | 102006053530 A1 | 5/2008 |
| DE | 202011109035 | 3/2013 |
| DE | 202017003775 U1 | 8/2017 |
| EP | 1600704 A1 | 11/2005 |
| EP | 2609827 A1 | 7/2013 |
| EP | 2722602 A2 | 4/2014 |
| EP | 3138439 A1 | 3/2017 |
| FR | 2858188 A1 | 2/2005 |
| FR | 2863151 A1 | 6/2005 |
| FR | 2881211 A1 | 7/2006 |
| GB | 2517786 | 3/2015 |
| JP | 4366326 B2 | 12/1992 |
| KR | 20150003655 A | 1/2015 |
| WO | 2008102403 A2 | 8/2008 |
| WO | 2010126350 A1 | 11/2010 |
| WO | 2016175725 A1 | 11/2016 |
| WO | 2016189457 A1 | 12/2016 |
| WO | 2017100820 A1 | 6/2017 |
| WO | 2018055430 A1 | 3/2018 |

OTHER PUBLICATIONS

Written Opinion for International Application No. PCT/IB2018/000165, International Filing Date Feb. 2, 2018, dated Oct. 24, 2018, 8 pages.

* cited by examiner

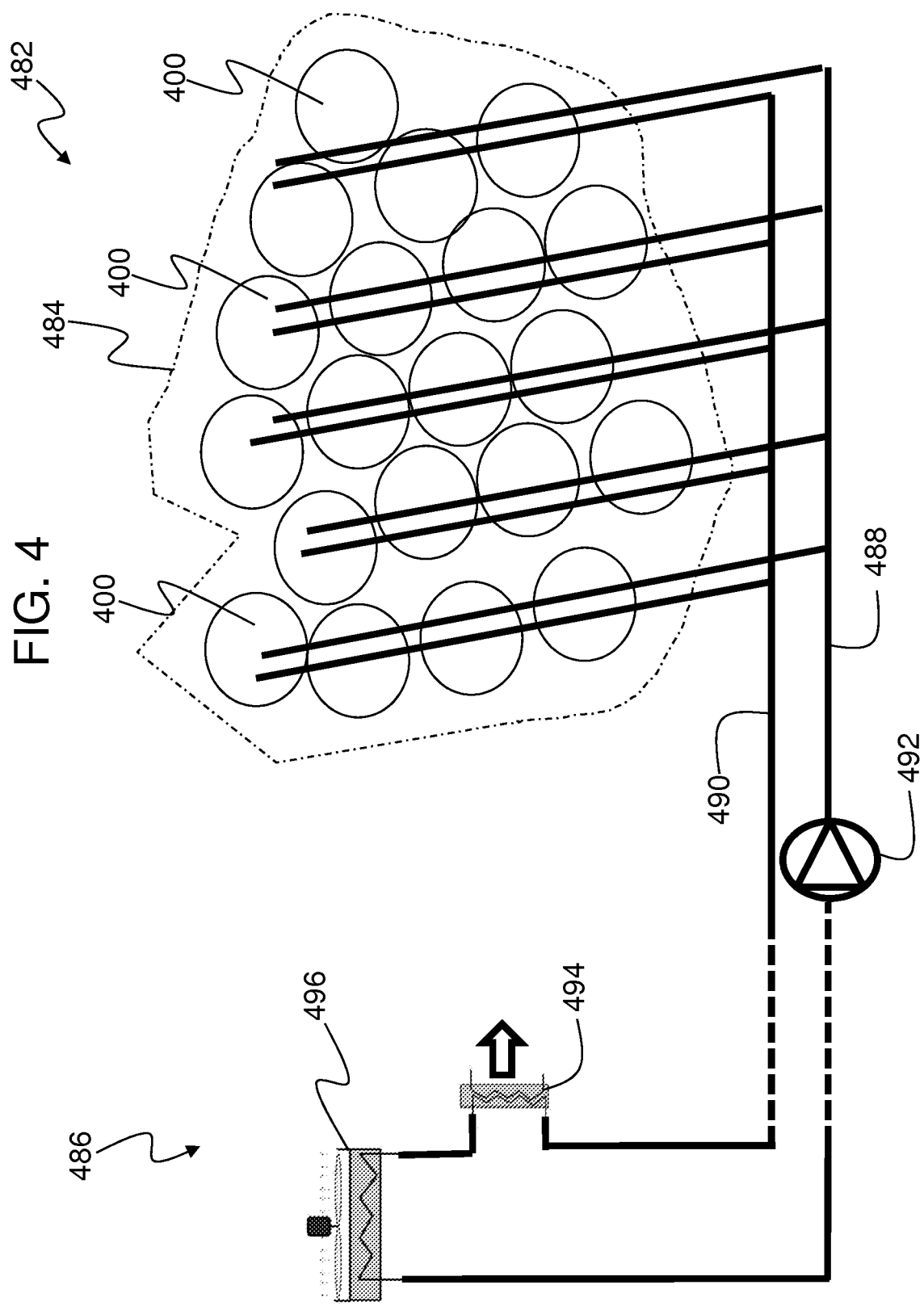

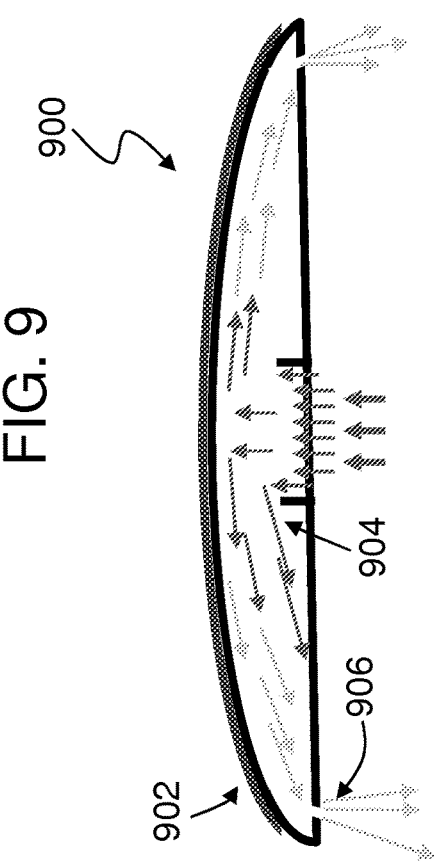
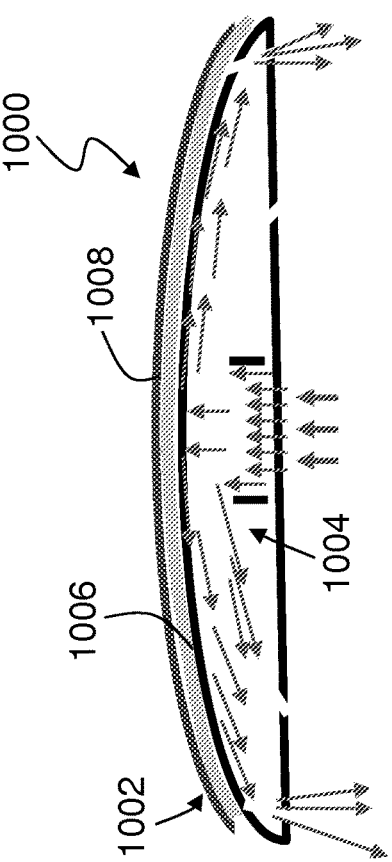
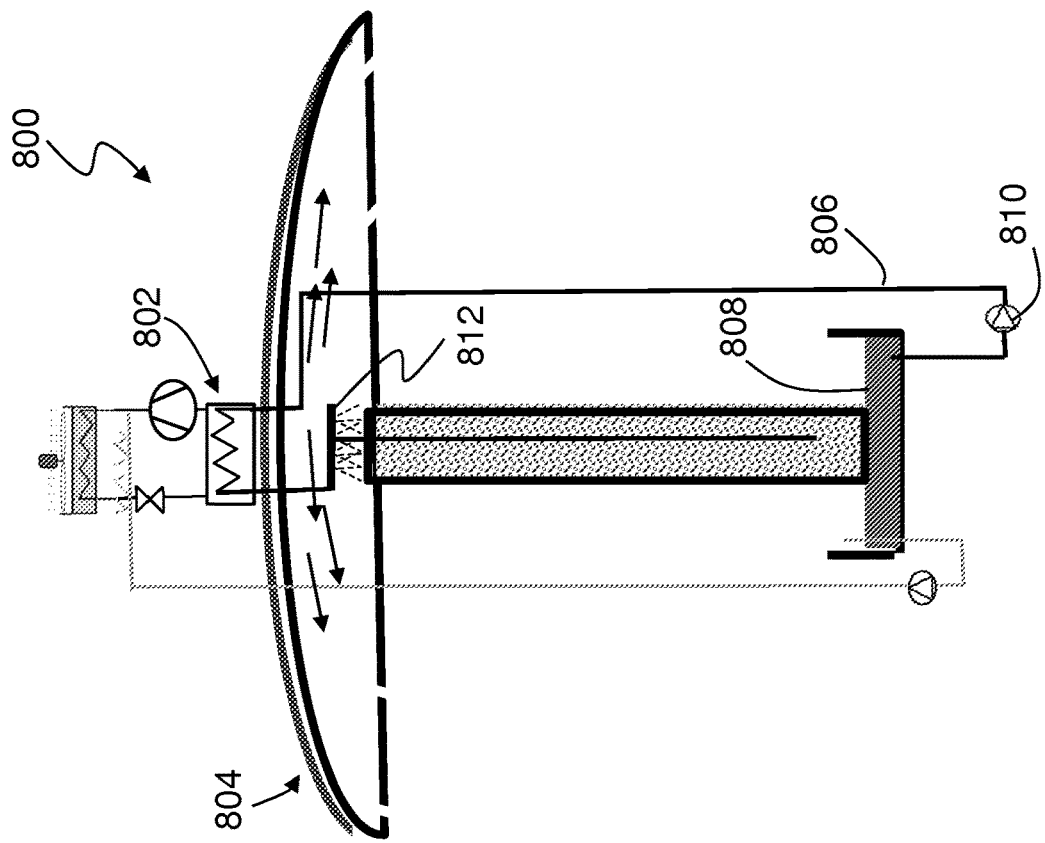

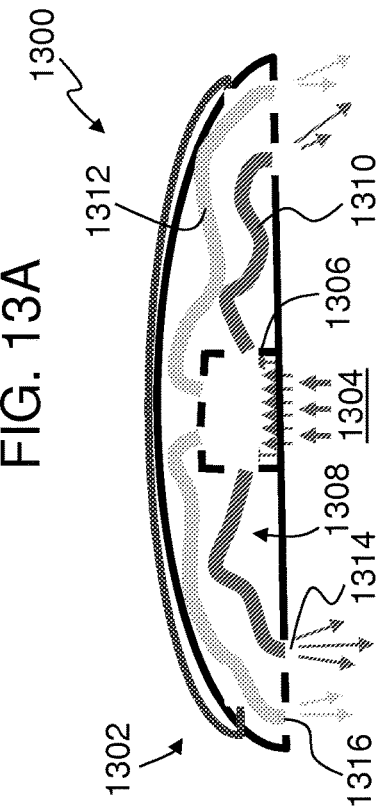 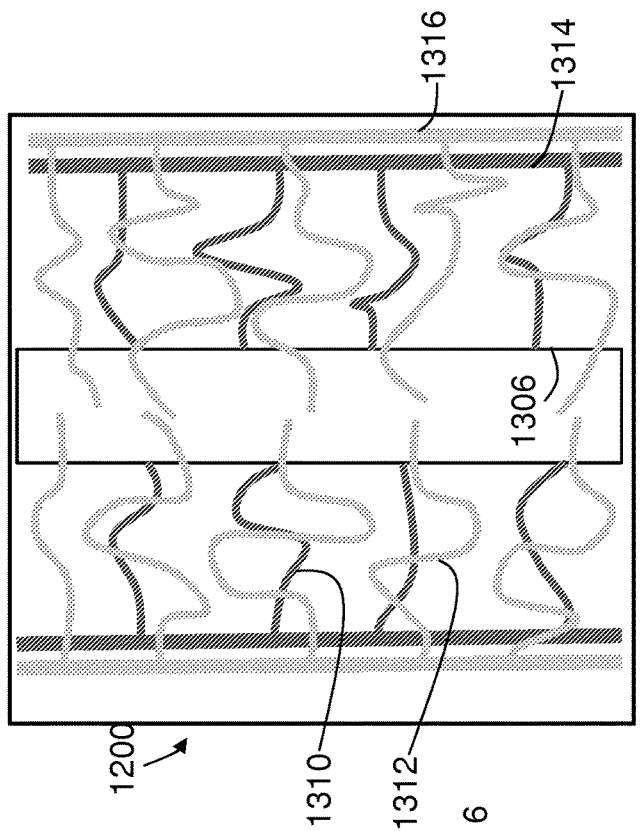
FIG. 12A  FIG. 13A
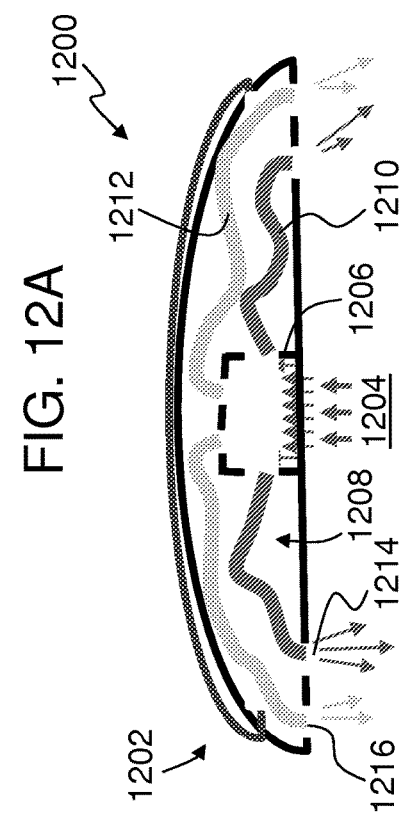 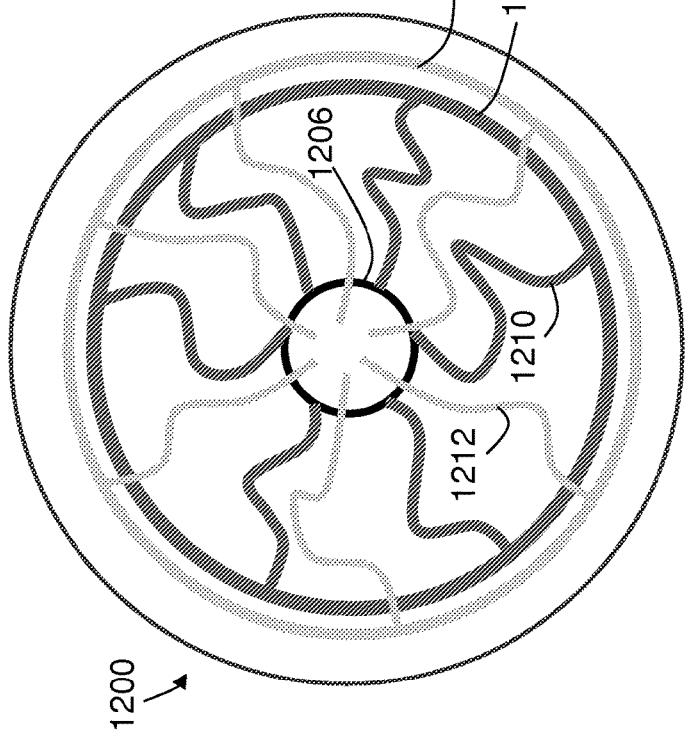
FIG. 12B  FIG. 13B

AIR COOLING UNIT

CROSS REFERENCE TO RELATED APPLICATIONS

This is a U.S. National Stage of Application No. PCT/IB2018/000165, filed Feb. 2, 2018, the disclosure of which is incorporated herein by reference in its entirety.

BACKGROUND

The subject matter disclosed herein generally relates to cooling units and, more particularly, to cooling units that can be modular and generate cooled areas in proximity to the cooling unit.

Air conditioning and/or cooling for outdoor areas can pose challenges due to moving air currents, thermal transfer, heat dissipation, lack of containment, etc. Accordingly, it may be advantageous to provide cooling units that can enable outdoor cooling in an efficient manner.

SUMMARY

According to some embodiments, cooling units are provided. The cooling units include a base having a housing with control components installed therein, a cooling tower attached to the base at a first end of the cooling tower, the cooling tower having an inner flow path and an exterior surface, and an air distribution system attached to the cooling tower at a second end of the cooling tower. The air distribution system includes a first enclosure, a second enclosure defining an air distribution chamber between the first and second enclosures, a cool air dispenser configured in the first enclosure, a warm air dispenser configured in the first enclosure at a location different from the cool air dispenser, and a cover disposed on an exterior surface of the second enclosure. The control components are configured to convey air through the base, the cooling tower, and the air distribution system to dispense air through the cool air dispenser and the warm air dispenser and a plurality of ducts connecting the cooling tower to at least one of the cool air dispenser and the warm air dispenser.

In addition to one or more of the features described above, or as an alternative, further embodiments of the cooling units may include a ducting supply chamber arranged at the top of the cooling tower and located within the air distribution system, wherein the plurality of ducts are connected to the ducting supply chamber.

In addition to one or more of the features described above, or as an alternative, further embodiments of the cooling units may include that the plurality of ducts are connected to a diffuser chamber that encompasses the cool air dispenser and the warm air dispenser.

In addition to one or more of the features described above, or as an alternative, further embodiments of the cooling units may include that a plurality of first ducts connect the cooling tower to the cool air dispenser and a plurality of second ducts connect the cooling tower to the warm air dispenser.

In addition to one or more of the features described above, or as an alternative, further embodiments of the cooling units may include a water treatment module fluidly connected to the cooling unit water supply to treat the water of the cooling unit water supply.

In addition to one or more of the features described above, or as an alternative, further embodiments of the cooling units may include a thermal insulating layer applied to the air distribution system.

In addition to one or more of the features described above, or as an alternative, further embodiments of the cooling units may include an electronics package.

In addition to one or more of the features described above, or as an alternative, further embodiments of the cooling units may include that the electronics package includes at least one of a camera, a display, and a speaker.

Technical effects of embodiments of the present disclosure include cooling units that are modular, energy efficient, and provide cooling for areas (e.g., outdoor areas) that typically cannot be cooled for various reasons.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 4 is a schematic illustration of a cooling system incorporating a plurality of cooling units in accordance with the present disclosure;

FIG. 8 is a schematic illustration of a cooling unit in accordance with another non-limiting embodiment of the present disclosure;

FIG. 9 is a schematic illustration of a cooling unit in accordance with another non-limiting embodiment of the present disclosure;

FIG. 10 is a schematic illustration of a cooling unit in accordance with another non-limiting embodiment of the present disclosure;

FIG. 12A is a schematic illustration of a cooling unit in accordance with another non-limiting embodiment of the present disclosure;

FIG. 12B is a plan view illustration of the cooling unit of FIG. 12A as viewed from below;

FIG. 13A is a schematic illustration of a cooling unit in accordance with another non-limiting embodiment of the present disclosure;

FIG. 13B is a plan view illustration of the cooling unit of FIG. 13A as viewed from below;

DETAILED DESCRIPTION

Air conditioning and/or cooling for outdoor areas can pose challenges due to moving air currents, thermal transfer, heat dissipation, lack of containment, etc. Embodiments of the present disclosure are directed to portable and/or modular cooling units that can be installed indoors or outdoors that provide regions of cooling air for persons in proximity to the cooling units.

Figure 1:
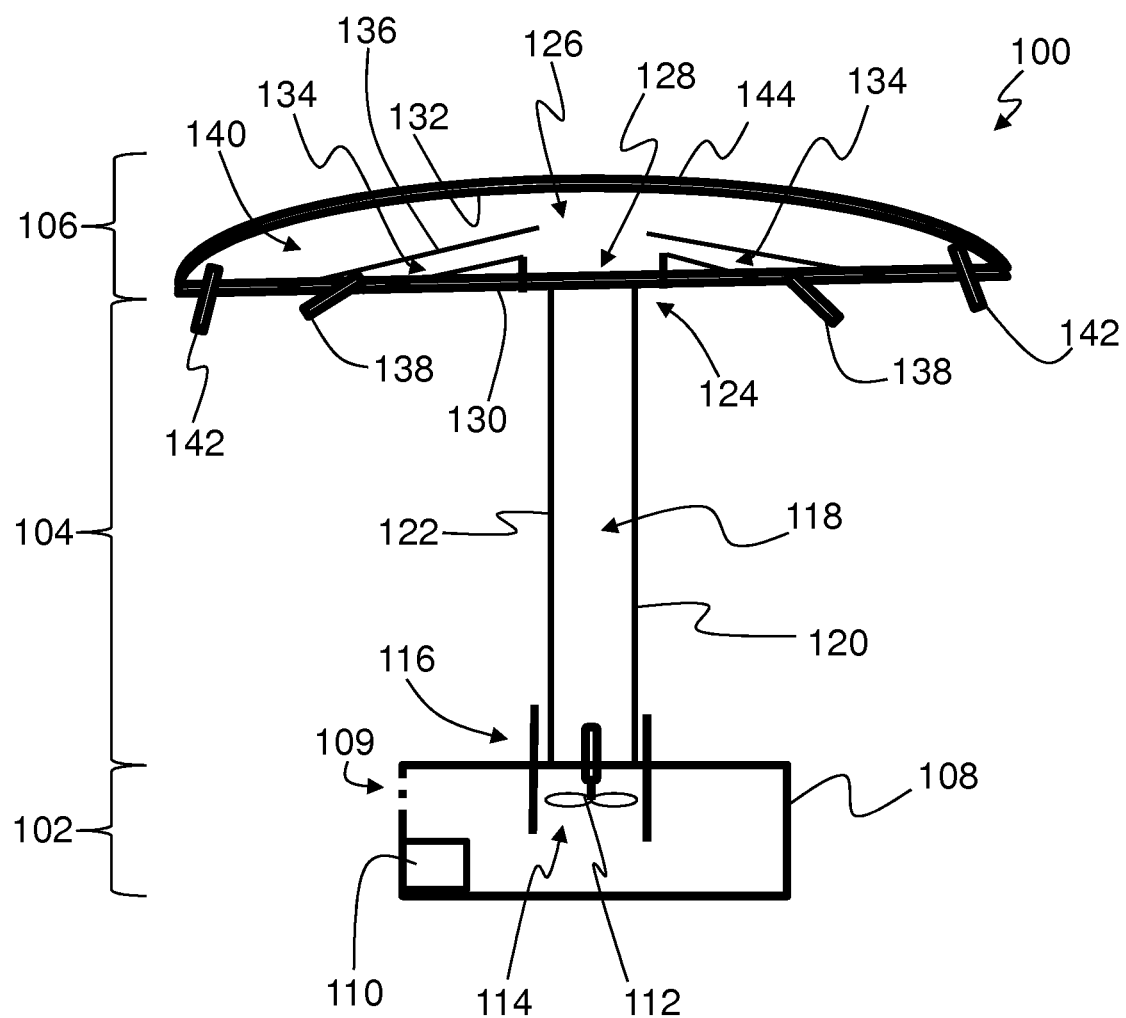
FIG. 1 is a schematic illustration of a cooling unit in accordance with an embodiment of the present disclosure.

For example, turning to FIG. 1, a schematic illustration of a cooling unit 100 in accordance with a non-limiting embodiment of the present disclosure is shown. As shown, the cooling unit 100 includes a base 102, a cooling tower 104, and an air distribution system 106. The cooling unit 100 is configured to employ water cooling to generate cooled or conditioned air that can be distributed from the air distribution system 106 to an area around the cooling unit 100. The components of the cooling unit 100 can be modular, with the cooling tower 104 being removably attached to the base 102 and the air distribution system 106 being removably attached to the cooling tower 104. In some embodiment, a single fixed structure can be formed, and in other embodiment, two of the components can be fixed together, with the third component being removably attached (e.g., fixed base and cooling tower, with changeable and/or exchangeable air distribution systems). Accordingly, the cooling unit 100 is not only module but also customizable.

The base 102, as shown, includes a housing 108 that contains control components 110 and, in the embodiment shown in FIG. 1, a blower 112. The housing 108 of the base 102 is structured and configured to support the cooling tower 104 and the air distribution system 106. Further, the housing 108 can include a first cooling tower connection aperture 114 that enables fluid communication between an interior of the housing 108 and the cooling tower 104 that is mounted to the base 102. As such, in some embodiments, the housing 108 can include framing, supports, etc. that are configured to provide structural rigidity and support to the other aspects of the cooling unit 100. Further, in some configurations the housing 108 can include various exterior features such as seating, cushions, etc. that are designed to enable persons in proximity to the cooling unit 100 to sit within a cooled air zone generated by the cooling unit 100. Further, in some embodiments, the housing 108 can include one or more inlet vents or apertures 109 on an exterior surface of the housing 108 to enable air to flow into the interior of the base 102. Additional connectors or features can be included as described herein and/or as will be appreciated by those of skill in the art without departing from the scope of the present disclosure.

The control components 110 can include electronic controllers (e.g., processors, microprocessors, memory, etc.), switches, motors, pumps, valves, heat exchanger components, etc. that are configured to control operation of the cooling unit 100. For example, the control components 110 include fluid or liquid control components that can be used to direct and control fluid flow into, through, and out of the cooling unit 100. Further, the control components 110 can include a fan controller to control the blower 112 to control a fan speed and/or direction of the blower 112. The controller components 110 can also include sensors or detectors that are configured to, for example, monitor temperatures (e.g., water and/or air temperatures), humidity in proximity to the cooling unit 100, air flow speeds in and through the cooling unit 100, power consumption and/or generation, fluid flows, etc. The sensors of the control components 110 may not be installed in the location schematically shown in FIG. 1, but rather may be installed at various locations in, on, and/or around the cooling unit 100 and may be in communication with a processor or other controller of the control components 110.

As noted, the blower 112 is configured within the cooling tower connection aperture 114 of the housing 108. The blower 112 is configured to direct and move air from the interior of the housing 108 into and through the cooling tower 104. The cooling tower 104, as noted, is mounted to or otherwise installed at a first end 116 (e.g., bottom) to the base 102 such that the cooling tower 104 is supported by the base 102. The cooling tower 104 defines a flow path that is configured to enable fluids (e.g., air, water, etc.) to be moved between the base 102 and the air distribution system 106. For example, as shown in FIG. 1, the cooling tower 104 can include an inner flow path 118 within a conduit 120. As such, the conduit 120 defines a hollow channel to enable air and/or water to be conveyed from the base 102 to the air distribution system 106. The conduit 120 includes an exterior surface 122 that can provide various functionalities as described herein.

Although shown in FIG. 1 with the blower 112 located within the housing 108 of the base 102, this configuration is not intended to be limiting. For example, in some alternative configurations, the blower/fan can be configured within the air distribution system at the top of the cooling unit. In such configurations, the blower/fan can be configured to pull air upward through the conduit, rather than pushing the air through the conduit (when positioned at the bottom of the conduit). Further still, in other embodiments, the blower/fan can be mounted and positioned within the cooling tower (e.g., at some vertical position between the base and the air distribution system). Further still, in some embodiments, multiple blowers/fans can be employed and positioned at different locations within the cooling unit.

The air that is passed through the cooling tower 104 is conveyed into the air distribution system 106 that is mounted and/or installed at a second end 124 (e.g., top) of the cooling tower 104. The air distribution system 106 includes various components that are configured to distribute conditioned air to an area or volume surrounding the cooling unit 100. Accordingly, the air distribution system 106 can be open to or otherwise fluidly connected to the conduit 120 such that air and/or water can flow from the flow path 118 into an air distribution chamber 126 defined within the air distribution system 106. That is, the air distribution chamber 126 is fluidly connected to the flow path 118 through a second cooling tower connection aperture 128.

The air distribution chamber 126 is defined between a first enclosure 130 and a second enclosure 132. The first enclosure 130 can include connectors, fasteners, or other mechanisms to rigidly connect and attach the air distribution system 106 to the cooling tower 104. The second enclosure 132 can be fixedly connected to the first enclosure 130 to define the air distribution chamber 126. In other embodiments, the first enclosure 130 and the second enclosure 132 can be integrally formed or molded to define the air distribution chamber 126. In any given configuration, the upper and first enclosures 130, 132 can be relatively fluidly sealed except where defined and required by the particular configuration of the cooling unit 100 (e.g., not sealed at the second cooling tower connection aperture 128 or at other locations as described herein).

The air distribution chamber 126 can be divided into multiple subchambers that are fluidly separated from each other at the first enclosure 130. For example, as shown, a first subchamber 134 is defined within a cool air conduit 136 that is located within the air distribution chamber 126. The cool air conduit 136 fluidly connects the second cooling tower connection aperture 128 to one or more cool air dispensers 138. A second subchamber 140 is defined between the cool air conduit 136 and the second enclosure 132. The second subchamber fluidly connects the second cooling tower connection aperture 128 to one or more warm air dispensers 142. The air dispensers 138, 142 can be nozzles, jets, tubes, holes, or apertures extending through or from or formed in the first enclosure 130. Thus, although shown in FIG. 1 as extending from the first enclosure 130, in some embodiments, the air dispensers 138, 142 can be holes or other structures that are flush with or do not extend from the first enclosure 130.

Also shown in FIG. 1, the second enclosure 132 can include an optional cover 144 on an exterior surface thereof. In some embodiments, the cover 144 can include solar panels or other power generating mechanisms. In other embodiments, the cover 144 can be a paint or coating applied to the exterior surface of the second enclosure 132. In such embodiments, the paint or coating can be used for advertisements, logos, or can have functional effects, such as cooling, energy generation, light reflection, etc. Further, in some embodiments, the cover 144 can be a canvas or other material sheet or similar covering that can be attached to the top of the cooling unit 100. The air within the second subchamber 140 can be in thermal communication with the cover 144 to provide cooling to the second subchamber 140 (e.g., the air in the second subchamber 140 can cool solar panels installed on the second enclosure 132).

Figure 2:
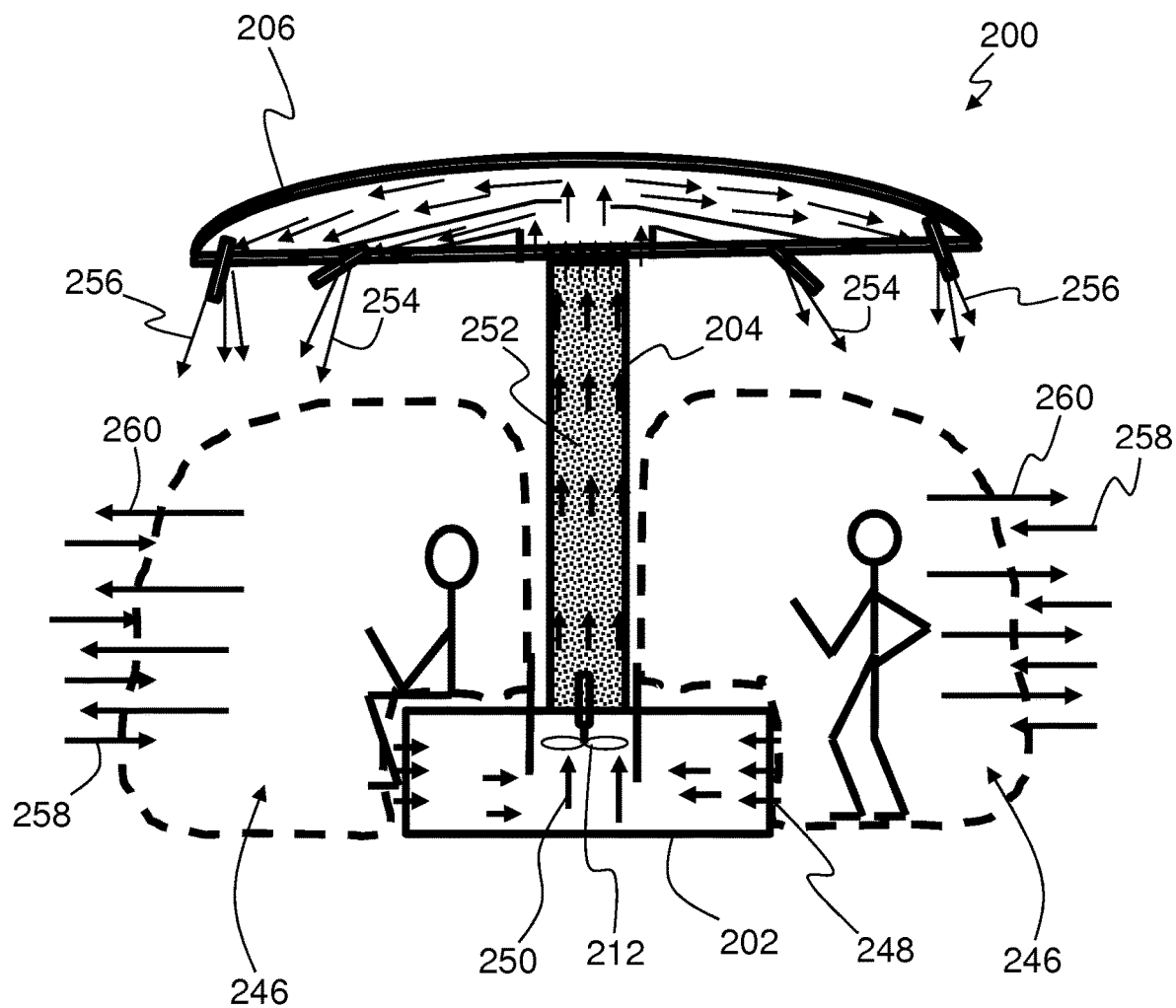
FIG. 2 is a schematic illustration of air flow through a cooling unit in accordance with an embodiment of the present disclosure.

Turning now to FIG. 2, a schematic illustration showing a cooled area 246 that is achieved through operation of a cooling unit 200 in accordance with an embodiment of the present disclosure is shown. That is, FIG. 2 illustrates a non-limiting configuration of an air circuit as produced by operation of cooling units in accordance with embodiments of the present disclosure. The cooling unit 200 is similar to that shown and described with respect to FIG. 1, and thus, for simplicity and clarity of illustration, the same or similar features will not be labeled and described again.

The cooling unit 200 is configured to generate the cooled area 246 through conditioning air within the cooling unit 200 and then dispensing the conditioned air into the cooled area 246 that is defined around the cooling unit 200. For example, the cooled area 246 can be partially contained under the air distribution system 206, which can have a configuration and components similar to that described above.

Operation of the cooling unit 200 can be controlled by control components that are housed within a base 202 of the cooling unit 200, within the air distribution system 206, within a cooling tower 204, and/or by a controller that is remote from the cooling unit 200. In FIG. 2, the dashed lines proximate to the cooling unit 200 define the cooled area 246 which included cooled and/or conditioned air that is dispersed from the cooling unit 200. A blower 212 is operated to pull ambient air 248, e.g., from the cooled area 246, into the housing of the base 202. The air can then be optionally conditioned into conditioned air 250 using a heat exchanger or other air conditioning element(s), as described below. The ambient air 248 can be moist or dry, hot or cold, etc. and the components within the base 202 will either extract moisture or inject moisture, depending on the desired operating conditions, thus generating the conditioned air 250.

The blower 212 will force the conditioned air 250 from the base 202 into the cooling tower 204. Within the cooling tower 204, the conditioned air 250 can be further conditioned by water droplets 252 that cascade or fall from the top of the cooling tower 204 (e.g., second end 124 in FIG. 1) toward the bottom of the cooling tower 204 (e.g., first end 116 in FIG. 1). The water droplets 252 are illustrated as stippling within the cooling tower 204 and the conditioned air 250 is indicated as upward direction arrows within the cooling tower 204. Thus, the conditioned air 250 can be further conditioned by mixing the conditioned air 250 with water in the form of the water droplets 252. In some embodiments, if the conditioned air 250 is not pre-conditioned within the base 202, the conditioning of the conditioned air 250 can be achieved as it passes through the cooling tower 204.

Figure 3A:
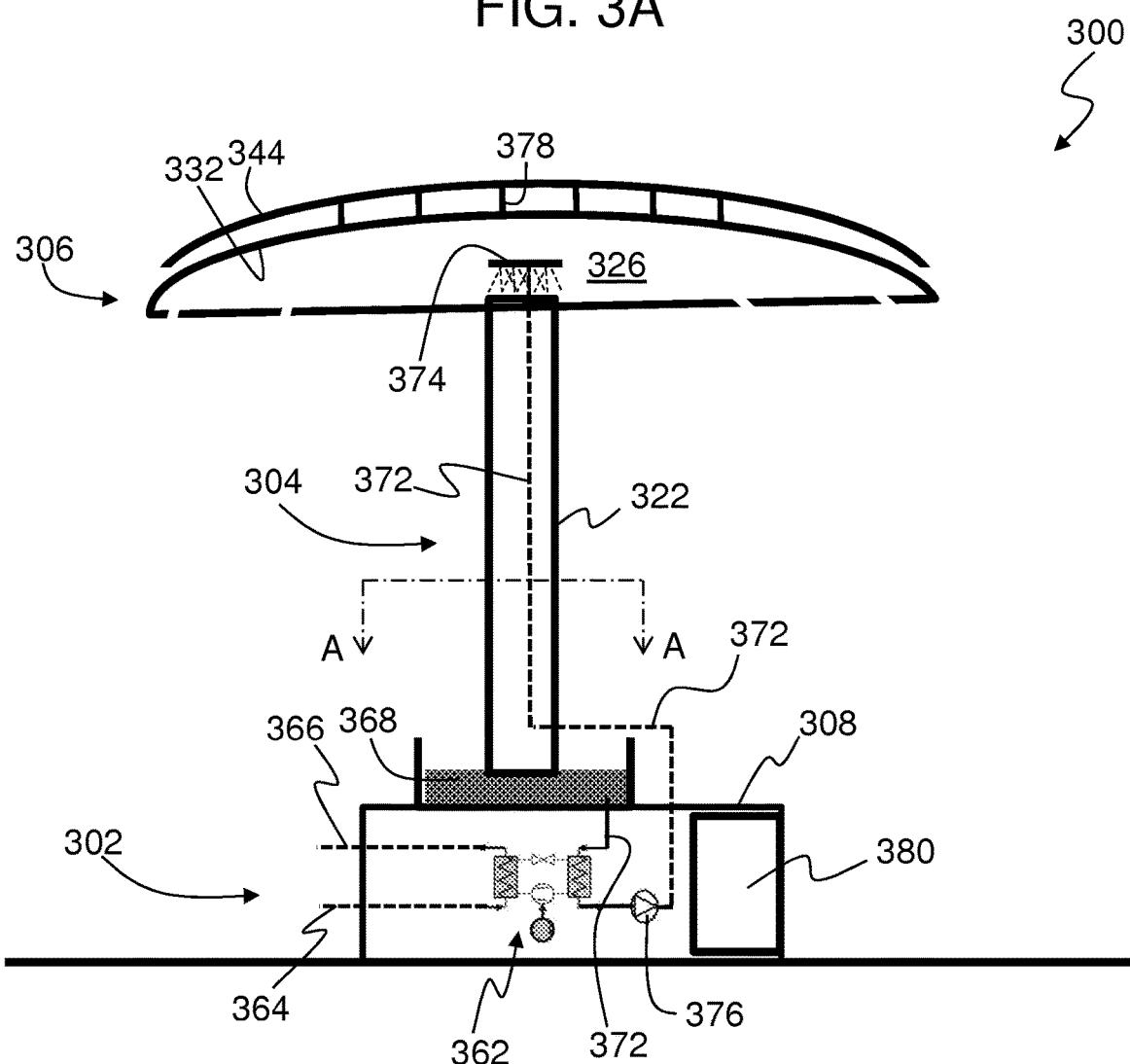
FIG. 3A is a schematic illustration of water flow through a cooling unit in accordance with an embodiment of the present disclosure.
Figure 3B:
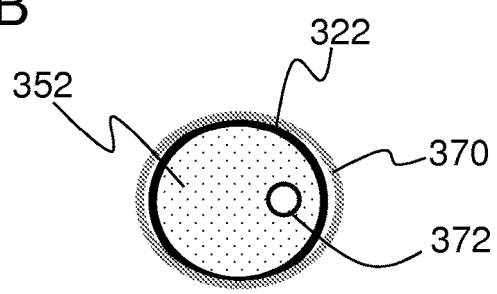
FIG. 3B is a cross-sectional illustration of the cooling unit of FIG. 3A along the line A-A.

The water droplets 252 can be supplied from the base 202 through one or more fluid supply lines (e.g., see FIGS. 3A-3B). The water droplets 252 can be pre-cooled or pre-chilled using various mechanics, including, but not limited to a heat exchanger within the base 202. Mixing the conditioned air 250 with the water droplets 252 can condition or otherwise "refresh" the air as it passes through the water droplets 252. Such conditioning may have limits based on ambient or outside air wet bulb temperature. Thus, the water of the water droplets 252 can be pre-chilled to a predetermined temperature or temperature range (e.g., 5-7° C. (41-45° F.)) to reduce a humidity level of the conditioned air 250.

In addition to pre-cooled or pre-chilled water (e.g., water droplets 252) being dispensed into the cooling tower 204 to condition the conditioned air 250, cool water can be cascaded down an exterior surface of the cooling tower 204. That is, with reference again to FIG. 1, cool water can be cascaded down the exterior surface 122 of the conduit 120, and thus provide local cooling adjacent the cooling tower 104. Accordingly, a cold "waterfall" can be provided on the exterior surface of the cooling tower 204 to enable additional cooling of both the ambient air immediately around the cooling tower 204 and within the conduit of the cooling tower 204.

The conditioned air 250 will then enter into the air distribution chamber of the air distribution system 206. The conditioned air will then move through the air distribution chamber to the first and second subchambers through which the conditioned air can exit the air distribution system at the air dispensers described above. For example, a portion of the conditioned air 250 can enter the first subchamber and exit through the cool air dispensers to provide cool, saturated air 254 (e.g., high moisture content) to the cooled area 246. Simultaneously, another portion of the conditioned air 250 can enter the second subchamber and exit through the warm air dispensers to provide dry, warm air 256 at an exterior or edge of the air distribution system 206. The dry, warm air 256 can define a bounded cooled area 246. The cooled area 246 can thus contain comfortable, conditioned air that may be pleasant to users of the cooling unit 200. As shown, the air may be cycled through the above described operation, wherein new air 258 can be pulled into the system (e.g., into the cooled area 246) and some amount of bleed air 260 will leave the cooled area 246.

With reference to FIGS. 1-2, the dry, warm air 256 that is dispensed from warm air dispensers 142 can be used to, at least in part, contain the cooled area 246. Thus, in some non-limiting embodiments, the warm air dispensers 142 can be angled to optimize this function. For example, the warm air dispensers 142 can be angled perpendicular to or at 90° from the first enclosure 130 (e.g., directly downward). Further, in some embodiments, the cool air dispensers 138 can be angled at a desired angle to provide optimized cool, saturated air 254 into the cooled area 246. For example, the cool air dispensers 138 can be angled at about 45° relative to the first enclosure 130.

Further, in some embodiments, the air dispensers 138, 142 can be passive and the air can be dispensed therefrom based on the velocity and pressure differentials that exist due to thermal gradients, humidity variations, and/or the power of the blower/fan 112/212. Alternatively, one or more of the air dispensers 138, 142 can be powered to accelerate the air as it is expelled from the air distribution chamber 126. For example, in one non-limiting configuration, the warm air dispensers 142 can be powered to generate an air curtain about the cooled area 246 and the cool air dispensers 138 can be powered or unpowered to provide cool air within the cooled area 246.

Turning now to FIGS. 3A-3B, schematic illustrations of a cooling unit 300 in accordance with an embodiment of the present disclosure is shown. The cooling unit 300 is similar to that described above, and thus similar features may not be labeled or discussed again. FIGS. 3A-3B illustrate a non-limiting configuration of a water circuit that is employed by cooling units in accordance with the present disclosure.

As shown, the cooling unit 300 includes a base 302, a cooling tower 304, and an air distribution system 306, similar to that described above. The base 302 includes various components that are part of control components of the cooling unit 300 (e.g., control components 110 of FIG. 1). For example, a housing 308 of the base 302 houses a heat exchange system 362 for providing pre-cooling to water that is employed within the cooling unit 300. In one non-limiting configuration, the heat exchange system 362 can include a water-to-water mini-chiller. A heat rejection inlet line 364 and a heat rejection outlet line 366 are fluidly connected to one portion of the heat exchange system 362 and are configured to extract heat from water that is cycled through the heat exchange system 362. A cooling unit water supply 368 is used for providing the water droplets 352 and exterior cool water 370 on an exterior surface 322 of the cooling tower 304, as described above and shown in FIG. 3B. A cooling unit water supply line 372 can be used to circulate water from the cooling unit water supply 368, through the heat exchange system 362, and to a water dispenser 374 that generates and disperses the water droplets 352 and the exterior cool water 370 from within an air distribution chamber 326 of the air distribution system 306. Further, as shown, a pump 376 can be configured along the cooling unit water supply line 372 to pump the chilled water to the water dispenser 374.

As shown, the cooling unit water supply line 372 is configured within and passes through the interior of the cooling tower 304. In other embodiments, the cooling unit water supply line 372 can be configured in other ways, such as, for example, extending along an exterior surface of the cooling tower 304. However, it may be advantageous to run the cooling unit water supply line 372 through the interior of the cooling tower 304 to provide insulation and cooling to the cooling unit water supply line 372 and/or thermal exchange with conditioned air and/or water droplets passing through the cooling tower.

The various aspects of the cooling unit 300 can be powered by a power source that is part of the cooling unit 300. For example, in some embodiments, the powered components (e.g., heat exchange system 362) can be powered through solar power generation provided by a cover 344 in the form of photovoltaic panels or other solar power generation mechanisms. The cover 344, as shown in FIG. 3A, is supported on a second enclosure 332 of the air distribution system 306 by one or more supports 378. In some embodiments, the supports 378 can be omitted and the cover can be directly applied to or otherwise attached to the exterior surface of the second enclosure 332.

In addition, or alternatively, the cooling unit 300 can be provided with batteries 380 that can be housed within the base 302. The batteries 380 can be configured as electrical power storage devices that store power generated by the solar panels of the cover 344. In other configurations, the batteries 380 can be charged using grid power. Additionally, in some embodiments, the cooling unit 300 can be connected to a generator, grid power, or other power sources as will be appreciated by those of skill in the art.

Turning to FIG. 4, a schematic illustration of a cooling system 482 incorporating multiple cooling units 400 in accordance with the present disclosure is shown. The illustration of the cooling system 482 is a plan schematic view (i.e., looking downward from above). Each of the cooling units 400 can be configured in accordance with the above described embodiments and/or variations thereon. Because of the multiple cooling units 400 the cooling system 482 can define an enlarged cooled area 484 that is generated by the cooling provided each of the individual cooling units 400.

As shown, the cooling units 400 can be arranged such that they can be fluidly connected to a heat rejection water system 486. The heat rejection water system 486 can be fluidly connected to the base of each of the cooling units 400 (e.g., as described above to enable heat exchange within the cooling units). A heat rejection inlet supply 488 can be provided and fluidly connected to the heat rejection inlet line of each individual cooling unit 400. Similarly, a heat rejection outlet supply 490 can be fluidly connected to the heat rejection outlet line of each individual cooling unit 400. The heat rejection inlet and outlet supplies 488, 490 can be used to provide thermal exchange at each cooling unit 400 and thus enable the cooling as described above.

The heat rejection inlet supply 488 can include a heat rejection pump 492 that is configured to convey water through the heat rejection inlet supply 488 and the heat rejection outlet supply 490. The heat rejection outlet supply 490 can be fluidly connected to a hot water network 494 or other water system (e.g., a water utility network) and thus the hot water generated by the cooling units 400 can be recovered and used for other functions. Furthermore, an optional dry cooler 496 can be provided to enable heat absorption to be able to condition the heat rejection water that is provided through the heat rejection inlet supply 488.

Figure 5:
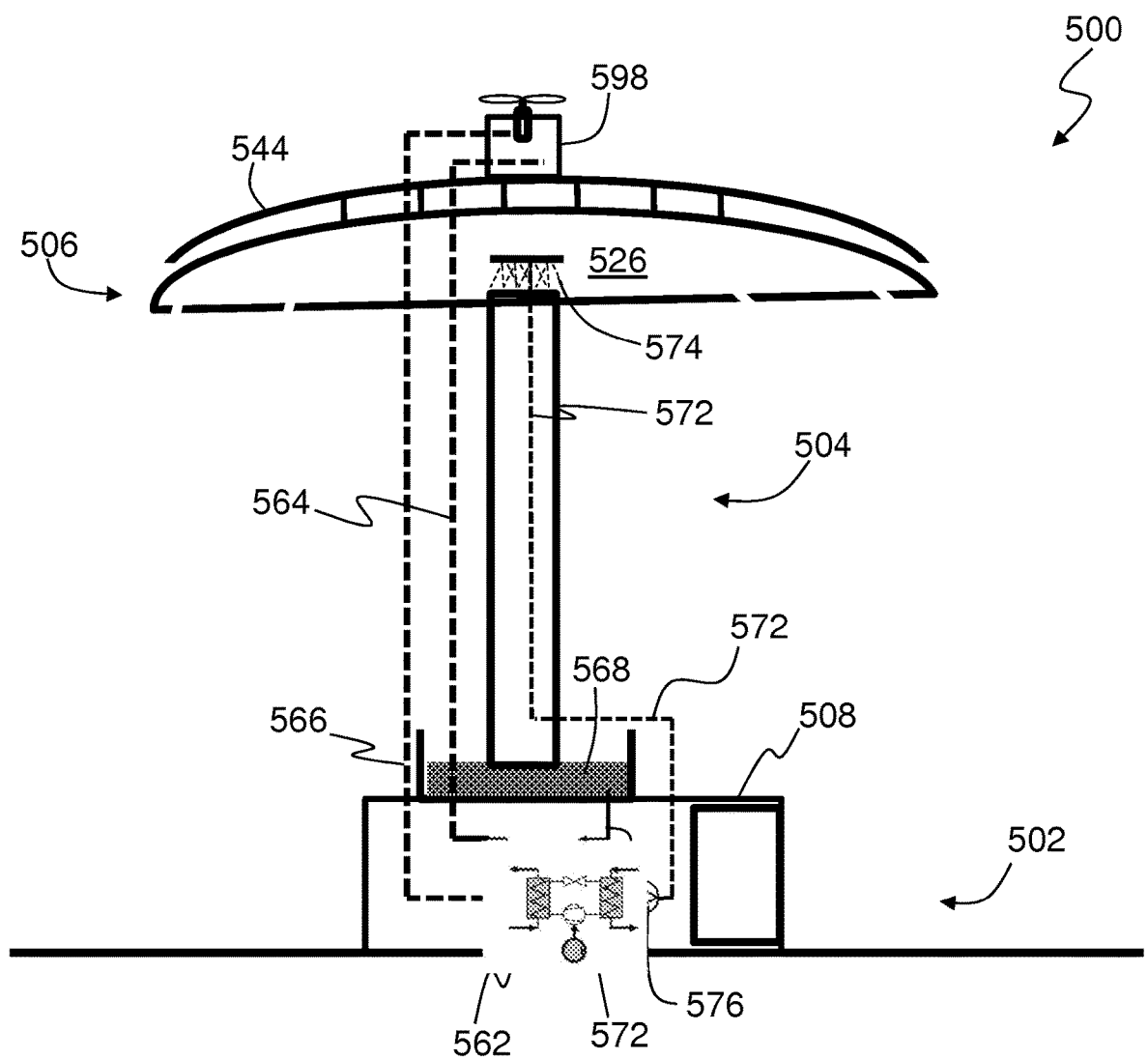
FIG. 5 is a schematic illustration of a cooling unit in accordance with a non-limiting embodiment of the present disclosure.

Turning now to FIG. 5, a schematic illustration of a cooling unit 500 in accordance with an embodiment of the present disclosure is shown. The cooling unit 500 is similar to that described above, and thus similar features may not be labeled or discussed again. FIG. 5 illustrates a non-limiting configuration of alternative configuration of a cooling unit in accordance with the present disclosure.

As shown, the cooling unit 500 includes a base 502, a cooling tower 504, and an air distribution system 506, similar to that described above. The base 502 includes various components that are part of control components of the cooling unit 500 (e.g., control components 110 of FIG. 1). For example, a housing 508 of the base 502 houses a heat exchange system 562 for providing pre-cooling to water that is employed within the cooling unit 500. As shown, the heat exchange system 562 includes a water-to-water mini-chiller. A heat rejection inlet line 564 and a heat rejection outlet line 566 are fluidly connected to one portion of the heat exchange system 562 and are configured to extract heat from water that is cycled through the heat exchange system 562. A cooling unit water supply 568 is used for providing water droplets and exterior cool water from a water dispenser 574. A cooling unit water supply line 572 can be used to circulate water from the cooling unit water supply 568, through the heat exchange system 562, and to the water dispenser 574 within an air distribution chamber 526 of the air distribution system 506. Further, as shown, a pump 576 can be configured along the cooling unit water supply line 572 to pump the chilled water to the water dispenser 574.

In the present configuration, the heat rejection inlet line 564 and the heat rejection outlet line 566 are locally contained such that the cooling unit 500 can be self-contained, in contrast to the above described embodiments that are fluidly connected to a centralized heat rejection system. For example, as shown in FIG. 5, the heat exchange system 562 can include a mounted heat rejection unit 598, such as a dry cooler, located on the cooling unit 500. For example, as shown in FIG. 5, the mounted heat rejection unit 598 can be mounted on or above the air distribution system 506 (e.g., on top of a cover 544). Advantageously, such configuration can eliminate the need for local infrastructure (e.g., no need for a water piping network). The mounted heat rejection unit 598 can include a fan, blower, cooling tubes, cooling finds, or other heat transfer and diffusing mechanisms.

Figure 6:
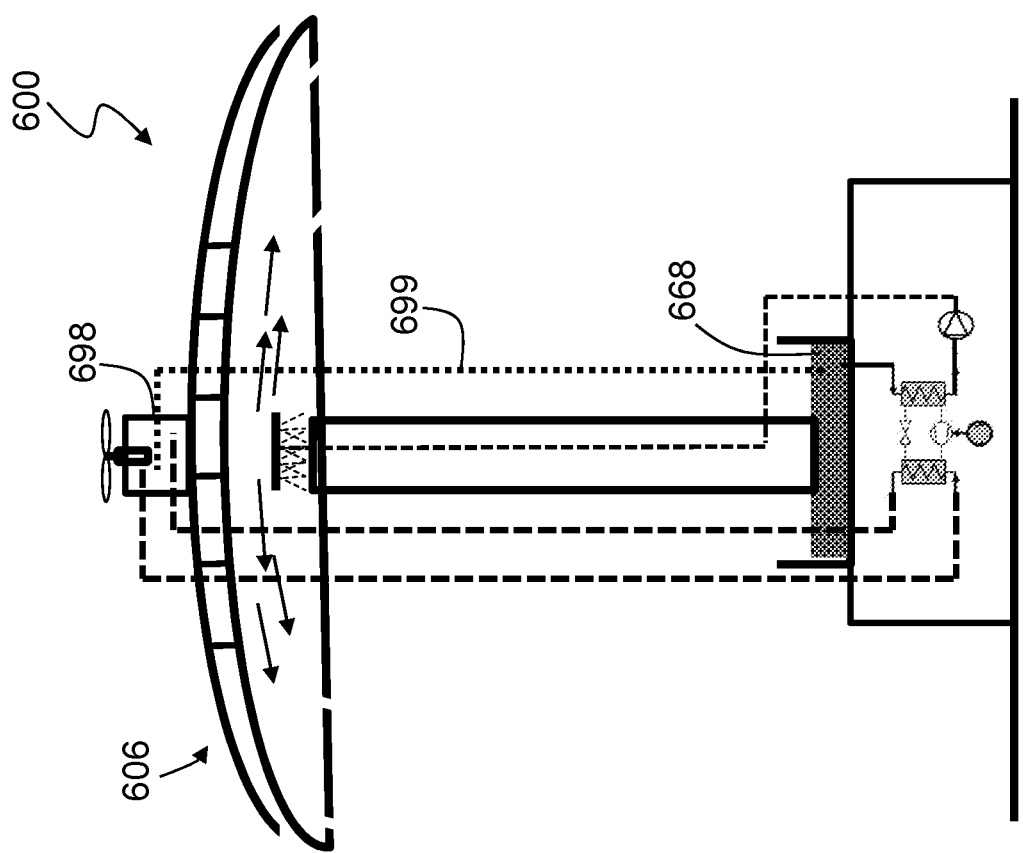
FIG. 6 is a schematic illustration of a cooling unit in accordance with another non-limiting embodiment of the present disclosure.

Turning now to FIG. 6, another alternative configuration of a cooling unit 600 in accordance with an embodiment of the present disclosure is shown. The cooling unit 600 may be employed in situations where ambient conditions provide excess water in the system (e.g., water contained in humid air will condensate in cold water in cooling tower and in external water fall). Accordingly, a condensate evacuation system 699 can be configured to extract and dispose of the excess water, e.g., from the cooling unit water supply 668. Such condensate evacuation system 699 can be employed in any of the above described embodiments, or variations thereon, although the cooling unit 600 of FIG. 6 is illustrated similar to that shown in FIG. 5, the condensate evacuation system 699 is not so limited.

In one non-limiting configuration, the condensate water may be pressurized to direct the condensate water to a mounted heat rejection unit 698 (e.g., similar to that shown in FIG. 5). Advantageously, such configuration can evacuate excess water to the air above an air distribution system 606 (e.g., no need for connection to heat rejection system) and the efficiency and/or effectiveness of the mounted heat rejection unit 698 can be improved (e.g., the condensate water can lower entering air temperature).

Figure 7:
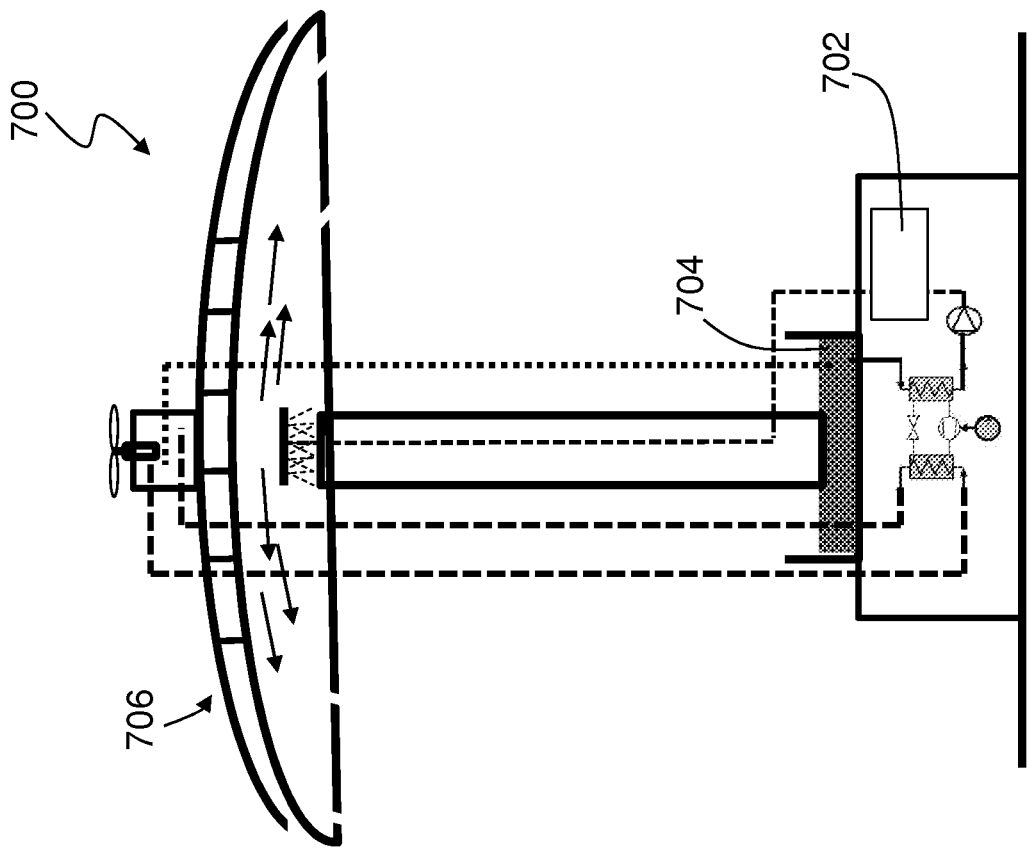
FIG. 7 is a schematic illustration of a cooling unit in accordance with another non-limiting embodiment of the present disclosure.

Turning now to FIG. 7, a schematic illustration of a cooling unit 700 in accordance with an embodiment of the present disclosure is shown. The cooling unit 700 may be similar to various of the above described embodiments, and thus similar features may not be described above. In this embodiment, the cooling unit 700 includes a water treatment module 702 that is arranged in the water recycling circuit (e.g., proximate a pump or similar equipment). The water that is cycled through the cooling unit 700 is in direct contact with the air surrounding the cooling unit 700. Thus, the water of the system can be used to filter or clean the air. That is, the water can be used to extract or collect contaminants, particulates, pollution, etc. from the air, and thus act as an air-cleaner. However, as the water collects such contaminants, the water itself may become contaminated, and thus cleaning or filtering the water may be required.

Accordingly, in the cooling unit 700 of the present embodiment, a cooling unit water supply 704 is employed similar to that described above and the water treatment module 702 is located downstream from the cooling unit water supply 704 and upstream of an air distribution system 706. The water treatment module 702 is arranged to treat or "clean" the water as it is conveyed to the air distribution system 706. Accordingly, the cooling unit 700 can be arranged to act as an "air washer."

To clean the air (and water) that surrounds the cooling unit 700, the water treatment module 702 can be configured to extract or remove dust and/or other particles/components from the water as it is cycled through the cooling unit 700. For example, different filters (e.g., physical, chemical, etc.) can be employed to remove various contaminants or undesirable properties that are collected within the water, particularly within the cooling unit water supply 704.

Turning now to FIG. 8, a schematic illustration of a cooling unit 800 in accordance with an embodiment of the present disclosure is shown. The cooling unit 800 may be similar to various of the above described embodiments, and thus similar features may not be described above. In this embodiment, the cooling unit 800 includes an air cooled chiller 802, as shown mounted on top of an air distribution system 804. A cooling unit water supply line 806 fluidly connects a cooling unit water supply 808 with the air cooled chiller 802. A pump 810 can be arranged to direct a portion of the water from the cooling unit water supply 808 up to the air cooled chiller 802. As the water passes through the air cooled chiller 802, heat will be dissipated, thus cooling the water. The air cooled water can then be directed to a water dispenser 812 of the air distribution system 804, to subsequently cool an area around the air distribution system 804.

Various air chiller configurations are possible without departing from the scope of the present disclosure. For example, specific adiabatic cooling ramps may be applied to the air that enters into the air cooled chiller 802. It will be appreciated that adiabatic cooling as employed herein means refreshing the air by adding droplets of water to the air stream. In a case when the air is relatively dry, adding water droplets result in lowering air temperatures. In accordance with embodiments of the present disclosure, the systems will have access to water (e.g., humidity from the air will condensate on cold water in a system and the water will be collected/stored/accessible in the cooling unit water supply 808). Accordingly, the water can be reused by refreshing the air entering an air cooled chiller condenser. Reducing air temperature entering to the chiller-condenser can result in lower condensing temperature and thus result in higher unit efficiency (e.g., lower energy consumption) and higher unit capacity. Similar efficiencies can be achieved using a "dry cooler" and water cooled chiller with condenser loop connected to the dry cooler.

Turning now to FIG. 9, a schematic illustration of a cooling unit 900 in accordance with an embodiment of the present disclosure is shown. The cooling unit 900 may be similar to various of the above described embodiments, and thus similar features may not be described above. In this illustration, only an air distribution system 902 is schematically shown for simplicity. Although not shown in FIG. 9, as shown and described above a conduit is arranged to supply air and/or water through a flow path into an air distribution chamber 904 defined within the air distribution system 902. In this embodiment, rather than a dual-feed/dispensing system, such as that shown and described above (e.g., FIGS. 3A-3B). In this embodiment, all cooled/moist air is conveyed into the distribution chamber 904, and subsequently dispersed therefrom.

A single chamber without divisions therein is employed in this embodiment. As such, one stream of air (homogenic) will be employed and only air dispenser 906 will be installed along a periphery of the air distribution system 902. In such embodiments, the cool air may enter the distribution chamber 904 and be warmed by an exterior surface/top of the air distribution system 902. However, such air will still be cooler than ambient air, and a cooled area will still be generated around the cooling unit 900. In some embodiments, a controlled re-heating can be employed to improve efficiencies. For example, materials of the various components, elements, and parts of the systems of the present disclosure can be selected to have specific heat transfer characteristics, and thus, transferring heat to and/or from an air stream can be customized and/or optimized for a specific system.

Turning to FIG. 10, a schematic illustration of a cooling unit 1000 in accordance with an embodiment of the present disclosure is shown. The cooling unit 1000 may be similar to various of the above described embodiments, and thus similar features may not be described above. In this illustration, only an air distribution system 1002 is schematically shown for simplicity. Although not shown in FIG. 10, as shown and described above a conduit is arranged to supply air and/or water through a flow path into an air distribution chamber 1004 defined within the air distribution system 1002. In this embodiment, rather than a dual-feed/dispensing system, such as that shown and described above (e.g., FIGS. 3A-3B). In this embodiment, all cooled/moist air is conveyed into the distribution chamber 1004, and subsequently dispersed therefrom.

In this embodiment, the air distribution system 1002 is arranged with a thermal insulator 1006 that can be arranged over a top of the air distribution system 1002. Further, in some embodiments, as shown, the thermal insulator 1006 may be arranged between the air distribution system 1002 and a cover 1008. In some such embodiments, the cover 1008 may include a coating or similar property to aid in cooling the cooling unit 1000. This arrangement may enable a cold saturated cooling air to be dispensed from the distribution chamber 1004.

Figure 11A:
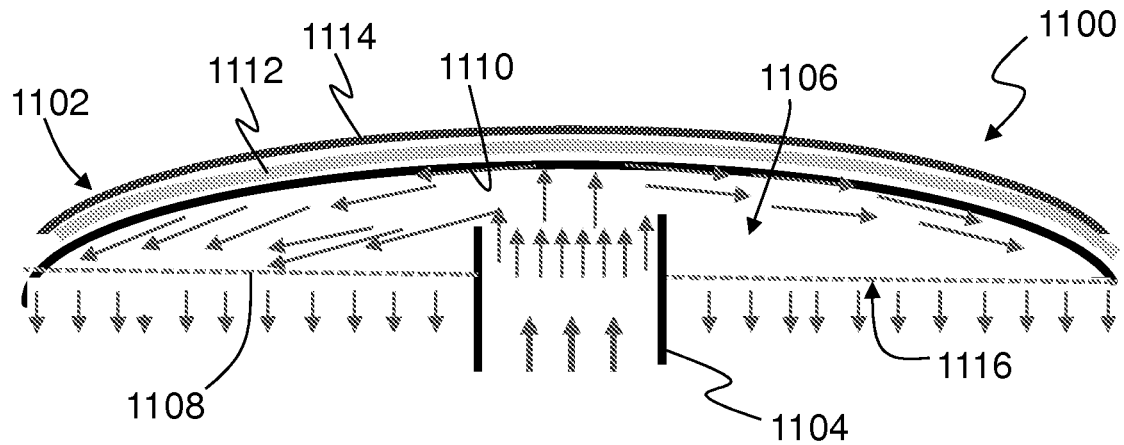
FIG. 11A is a schematic illustration of a cooling unit in accordance with another non-limiting embodiment of the present disclosure.
Figure 11B:
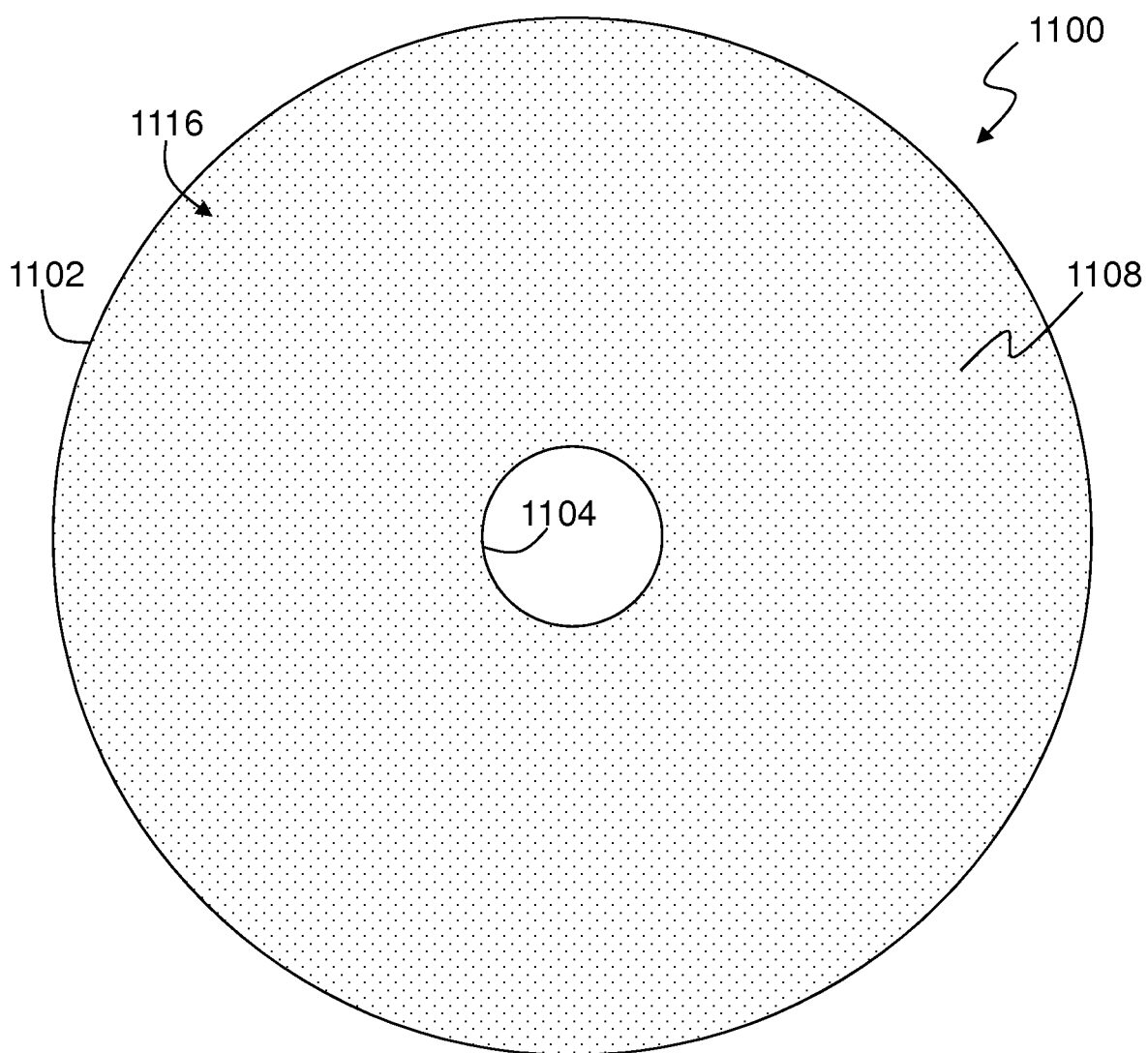
FIG. 11B is a plan view illustration of the cooling unit of FIG. 11A as viewed from below.

Turning now to FIGS. 11A-11B, schematic illustrations of a cooling unit 1100 in accordance with an embodiment of the present disclosure are shown. FIG. 11A is a side cross-sectional illustration of the cooling unit 1100 and FIG. 11B is a plan view looking at the bottom of the cooling unit 1100. The cooling unit 1100 may be similar to various of the above described embodiments, and thus similar features may not be described above. In this illustration, an air distribution system 1102 is shown being supplied with moist, cool air through a conduit 1104. The conduit 1104 is arranged to supply air and/or water through a flow path into an air distribution chamber 1106 defined within the air distribution system 1102. The air distribution chamber 1106 is defined between a first enclosure 1108 and a second enclosure 1110, similar to that described above. As schematically shown, and as described above, the second enclosure 1110 can include a thermal insulator 1112 and a cover 1114.

In this embodiment, rather than a dual-feed/dispensing system, such as that shown and described above (e.g., FIGS. 3A-3B), the moist, cooled air is dispersed from a single air distribution chamber 1106 that is not separated. Further, rather than using discrete air dispensers (e.g., nozzles or other structures), the first enclosure 1108 (or a portion thereof) is formed of a porous material or configuration that includes a plurality of dispersing apertures 1116 (e.g., holes, perforated plate, porous material, etc.). As such, in this embodiment, a curtain-like air arrangement may not be achieved. However, a relatively uniform distribution of cool, moist air may be provided within the area below the cooling unit 1100. In some such embodiments, the diffusion system for the cold umbrella concept may be a porous media type of diffusion, or as noted, perforated or venting holes can be formed in the material of the first enclosure 1108. In this arrangement, the diffusion of cooled air will act as falling air shower with very low air velocity, with the cold air pulled through the material of the first enclosure 1108 by the force of gravity (e.g., cold air is more dense and naturally falls).

Turning now to FIGS. 12A-12B, schematic illustrations of a cooling unit 1200 in accordance with an embodiment of the present disclosure are shown. FIG. 12A is a side cross-sectional illustration of the cooling unit 1200 and FIG. 12B is a plan view looking at the bottom of the cooling unit 1200. The cooling unit 1200 may be similar to various of the above described embodiments, and thus similar features may not be described above. In this illustration, an air distribution system 1202 is shown being supplied with moist, cool air through a conduit 1204 (schematically shown). The conduit 1204 is arranged to supply air and/or water through a flow path into ducting supply chamber 1206 located within an air distribution chamber 1208. The ducting supply chamber 1206 is fluidly connected to a plurality of ducts 1210, 1212.

In this embodiment, the ducts 1210, 1212 are flexible air ducts (which may be singular or in multiple) which connect the ducting supply chamber 1206 (which received saturated cold air from the conduit 1204) to respective diffusers 1214, 1216. Similar to some embodiments described above, cool, saturated air can be directed through a first duct 1210 (and out first diffusers 1214) and dry air can be directed through a second duct 1212 (and out second diffusers 1216). As such, a curtain can be generated by the output through the second diffusers 1216 to contain the cool air from the first diffusers 1214. In some embodiments, the first duct 1210 may be thermally insulated and the second duct 1212 that supplies "dry air" may not be insulated. The second duct 1212 can thus act as heat exchanger between air and the adjacent space (e.g., the air distribution chamber 1208). The air in the second duct 1212 will be reheated and the surrounding air within the air distribution chamber 1208 will be cooled. The cooler air within the air distribution chamber 1208 can be used to cool an energy generation element that is mounted to the cooling unit 1200 (e.g., photovoltaic panels, etc.). Such cooling can enable improved efficiency of such energy generation elements.

Turning now to FIGS. 13A-13B, schematic illustrations of a cooling unit 1300 in accordance with an embodiment of the present disclosure are shown. FIG. 13A is a side cross-sectional illustration of the cooling unit 1300 and FIG. 13B is a plan view looking at the bottom of the cooling unit 1300. The cooling unit 1300 is substantially similar to the cooling unit 1200 of FIGS. 12A-12B, having an air distribution system 1302 supplied with moist, cool air through a conduit 1304. The conduit 1304 is arranged to supply air and/or water through a flow path into ducting supply chamber 1306 located within an air distribution chamber 1308. The ducting supply chamber 1306 is fluidly connected to a plurality of ducts 1310, 1312, which in turn disperse air through respective diffusers 1314, 1316. The difference between the present embodiment and that of FIGS. 12A-12B is the shape of the cooling unit 1300. As shown in FIGS. 13A, the cooling unit 1300 has a rounded shape in cross-section. However, in plan view, rather than the circular shape of the prior shown and described embodiments, the cooling unit is squared (or rectangular). As a result, the diffusers 1314, 1316 of the present embodiment are linear (as compared to the circular diffusers 1214, 1216 shown in FIGS. 12A).

Figure 14:
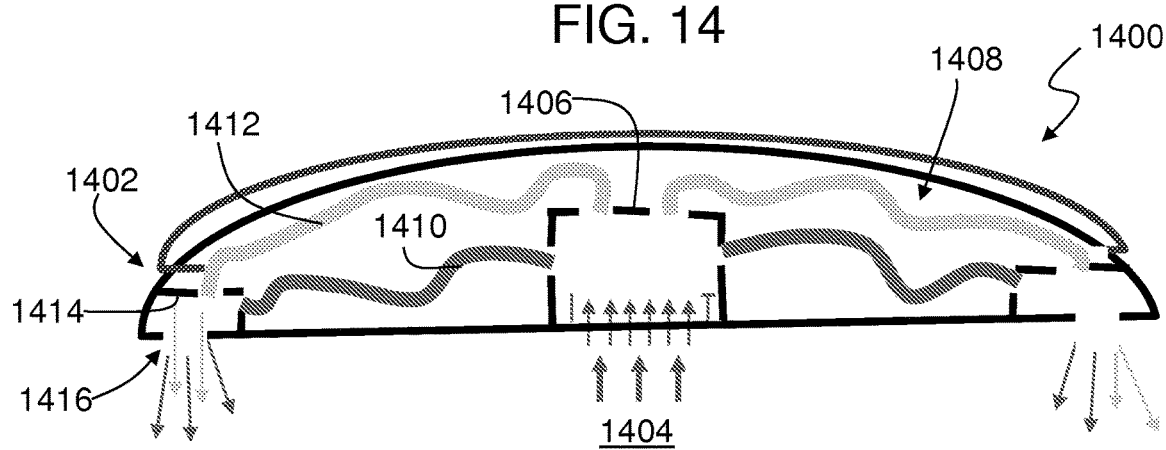
FIG. 14 is a schematic illustration of a cooling unit in accordance with another non-limiting embodiment of the present disclosure.

Turning now to FIG. 14, a schematic illustrations of a cooling unit 1400 in accordance with an embodiment of the present disclosure is shown. The cooling unit 1400 has an air distribution system 1402 supplied with moist, cool air through a conduit 1404. The conduit 1404 is arranged to supply air and/or water through a flow path into a ducting supply chamber 1406 located within an air distribution chamber 1408. The ducting supply chamber 1406 is fluidly connected to a plurality of ducts 1410, 1412 similar to the arrangements described above. However, the ducts 1410, 1412 are arranged to connect to a single diffuser chamber 1414, which in turn disperses air through a diffuser 1416. The diffuser chamber 1414 can provide for mixing of cool moist air and dry air within the diffuser chamber 1414 as supplied from the ducts 1410, 1412.

Figure 15:
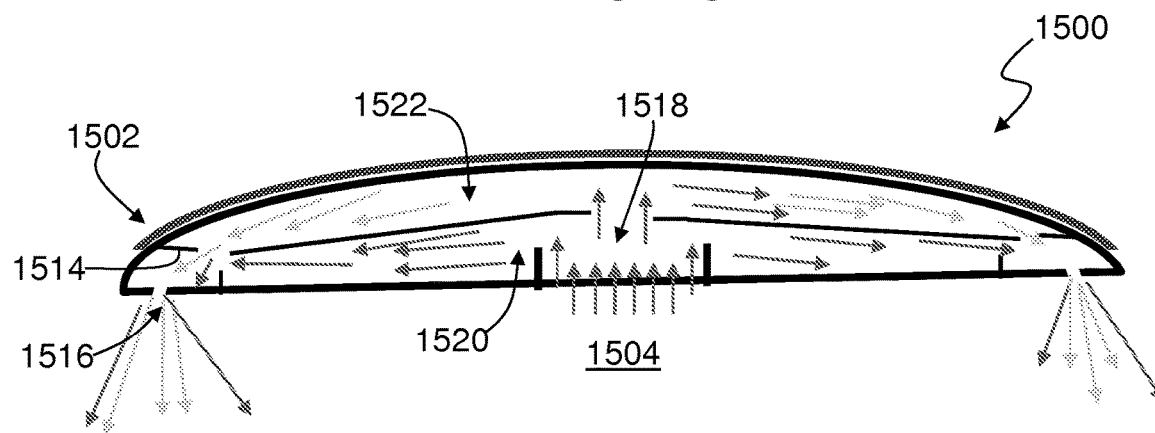
FIG. 15 is a schematic illustration of a cooling unit in accordance with another non-limiting embodiment of the present disclosure.

Turning now to FIG. 15, a schematic illustrations of a cooling unit 1500 in accordance with an embodiment of the present disclosure is shown. The cooling unit 1500 has an air distribution system 1502 supplied with moist, cool air through a conduit 1504. The conduit 1504 is arranged to supply air and/or water through a flow path a second cooling tower connection aperture 1518, similar to that shown and described with respect to FIG. 1. The second cooling tower connection aperture 1518 provides air into a cool air conduit defining a first subchamber 1520 of an air distribution chamber 1508 and a second subchamber 1522 thereof (similar to the structure shown and described with respect to FIG. 1). However, the subchambers 1520, 1522 are arranged to fluidly connect to a single diffuser chamber 1514, which in turn disperses air through a diffuser 1516. The diffuser chamber 1514, similar to the embodiment of FIG. 14, can provide for mixing of cool moist air and dry air within the diffuser chamber 1514 as supplied from the subchamber 1520, 1522.

Figure 16:
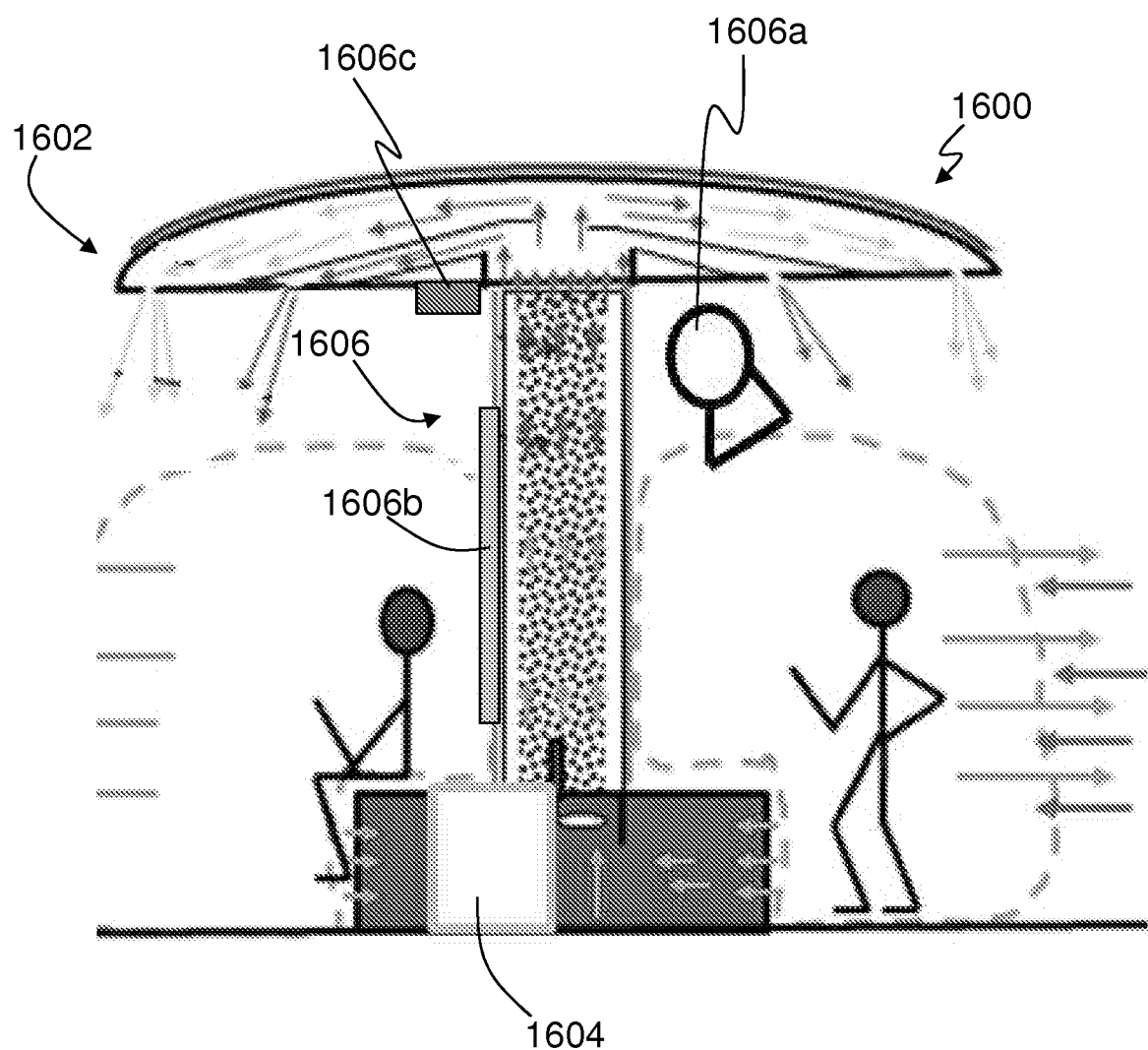
FIG. 16 is a schematic illustration of a cooling unit in accordance with another non-limiting embodiment of the present disclosure.

Turning now to FIG. 16, a schematic illustrations of a cooling unit 1600 in accordance with an embodiment of the present disclosure is shown. The cooling unit 1600 has an air distribution system 1602 arranged to generate a cooled area thereunder, as shown and described above. In this embodiment, the cooing unit 1600 is configured with a control system 1604 and an electronics package 1606. In this illustrative embodiment, the electronics package 1606 includes a first electronics element 1606a, a second electronics element 1606b, and a third electronics element 1606c, although more or fewer electronics elements may be included in the electronics package of various embodiments.

The control system 1604 may be a computer or processor element arrange to control operation of the cooling unit 1600. The control system 1604 can be in communication with one or more elements of the cooling unit 1600 (e.g., pumps, motors, etc. that are used to generate a cool area around the cooling unit 1600). Further, the control system 1604 can be in communication with one or more of the electronics elements 1606a, 1606b, 1606c of the electronics package 1606. In some embodiments, the control system 1604 may be configured to control operation of the cooling unit 1600 based on information obtained from one or more of the electronics elements 1606a, 1606b, 1606c of the electronics package 1606.

As shown, the first electronics element 1606a is illustratively shown as a camera mounted to the cooling unit 1600. The camera may be arranged to capture images and/or video of the cooling unit 1600 and/or the area around the cooling unit 1600. For example, the camera may be employed to detect damage or malfunction of the cooling unit 1600. Further, the camera may be employed to detect if persons are in proximity to the cooling unit 1600. If damage or malfunction is detected, a call for maintenance may be automatically made from the control system 1604. Further, if one or more persons are detected in proximity to the cooling unit 1600, the control system 1604 can activate the cooling air generation by operation of the cooling unit 1600. Furthermore, in some embodiments, the camera can be employed to monitor weather conditions (if the control system 1604 is not connected to a weather system trigger—e.g., the internet and internal software), optimization of specific modes relative to outside conditions can be achieved.

The control system 1604 can also be in communication with the parts of the cooling unit 1600 that enable operation and generation of the cooling area, as noted above. For example, by being connected to or in communication with a filter monitor/sensor, flow sensors, etc. optimization of maintenance may be achieved.

As noted above, the control system 1604 may be connected to the internet and have internal software and programming to trigger specific operational parameters based on information received through a connection. For example, the control system 1604 may be connected to weather forecast systems and can be arranged to enable change mode of operation in case of unfavorable weather conditions (wind, storm, rein, etc.). Additionally, the internet connection may enable remote operation by an operator to control the cooling unit from a remote location.

The electronics package 1606 can also include other devices such as displays, routers, speakers, information dissemination devices, etc. For example, as schematically shown, the second electronics element 1606b is a screen or display that is mounted to the cooling tower of the cooling unit 1600. The second electronics element 1606b can be used to provide information to persons within the cooling area of the cooling unit 1600. The second electronics element 1606b can include one or more speakers for outputting audio to persons in proximity to the cooling unit 1600.

The third electronics element 1606c can be a data transmission device (e.g., a router or other wireless broadcasting device and/or connection device). As such, the cooling unit 1600 can operate as a hotspot for persons using the cooling unit 1600 and thus provide an internet connection to such users. In some embodiments, the data transmission device can be any type of connection, wired or wireless, to enable connection capability, including but not limited to, a router, a femtocell, an LTE or other cellular broadcasting device, etc.

Although shown and described above typically as a single unit, as noted with respect to FIG. 4, cooling systems incorporating multiple cooling units in accordance with the present disclosure can be employed. FIG. 4 illustrates a plurality of cooling units that are distinctly separate from each other. However, other arrangements of multiple cooling units are possible in accordance with the present disclosure.

Figure 17A:
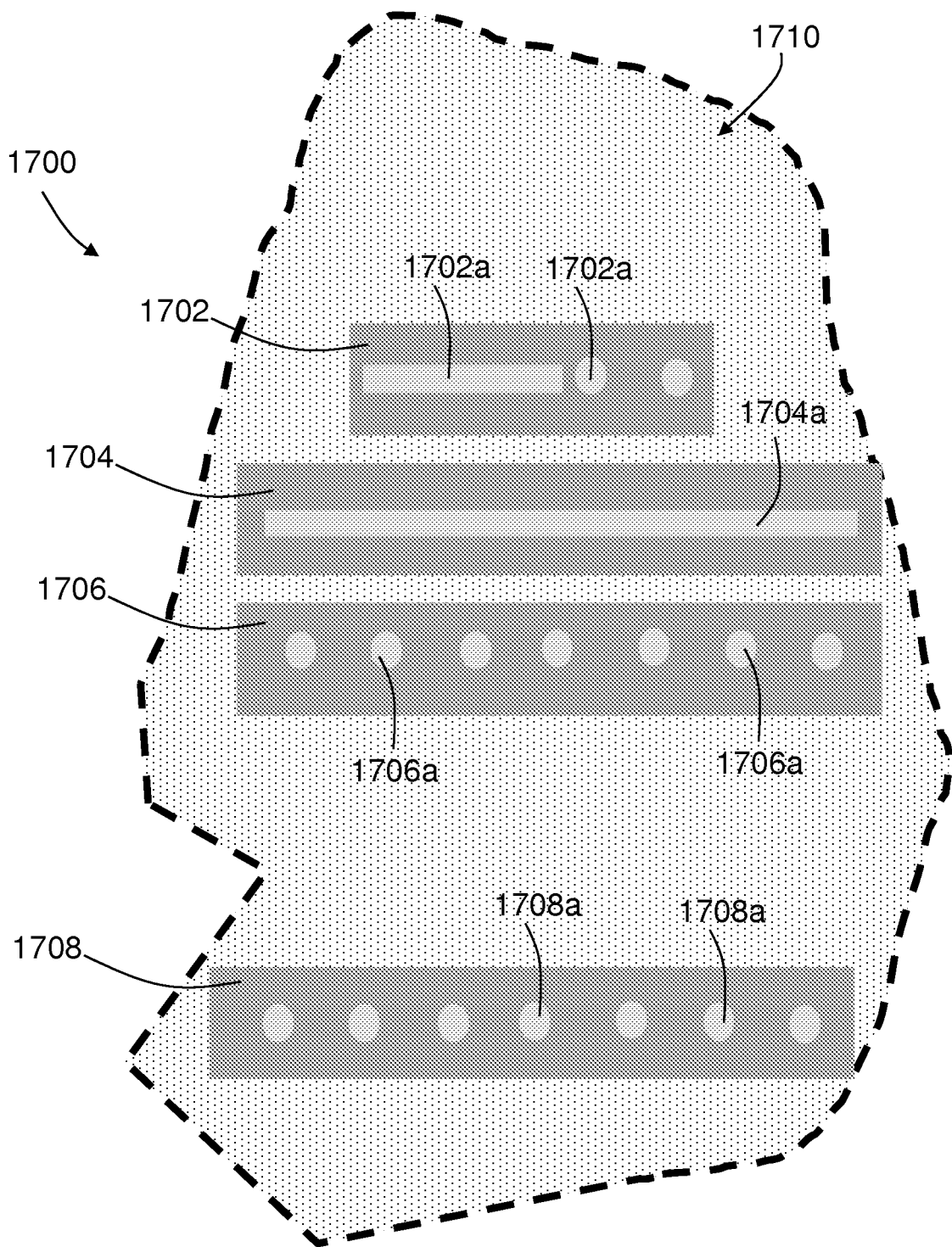
FIG. 17A is a schematic illustration of a cooling system in accordance with another non-limiting embodiment of the present disclosure incorporating a plurality of cooling units.
Figure 17B:
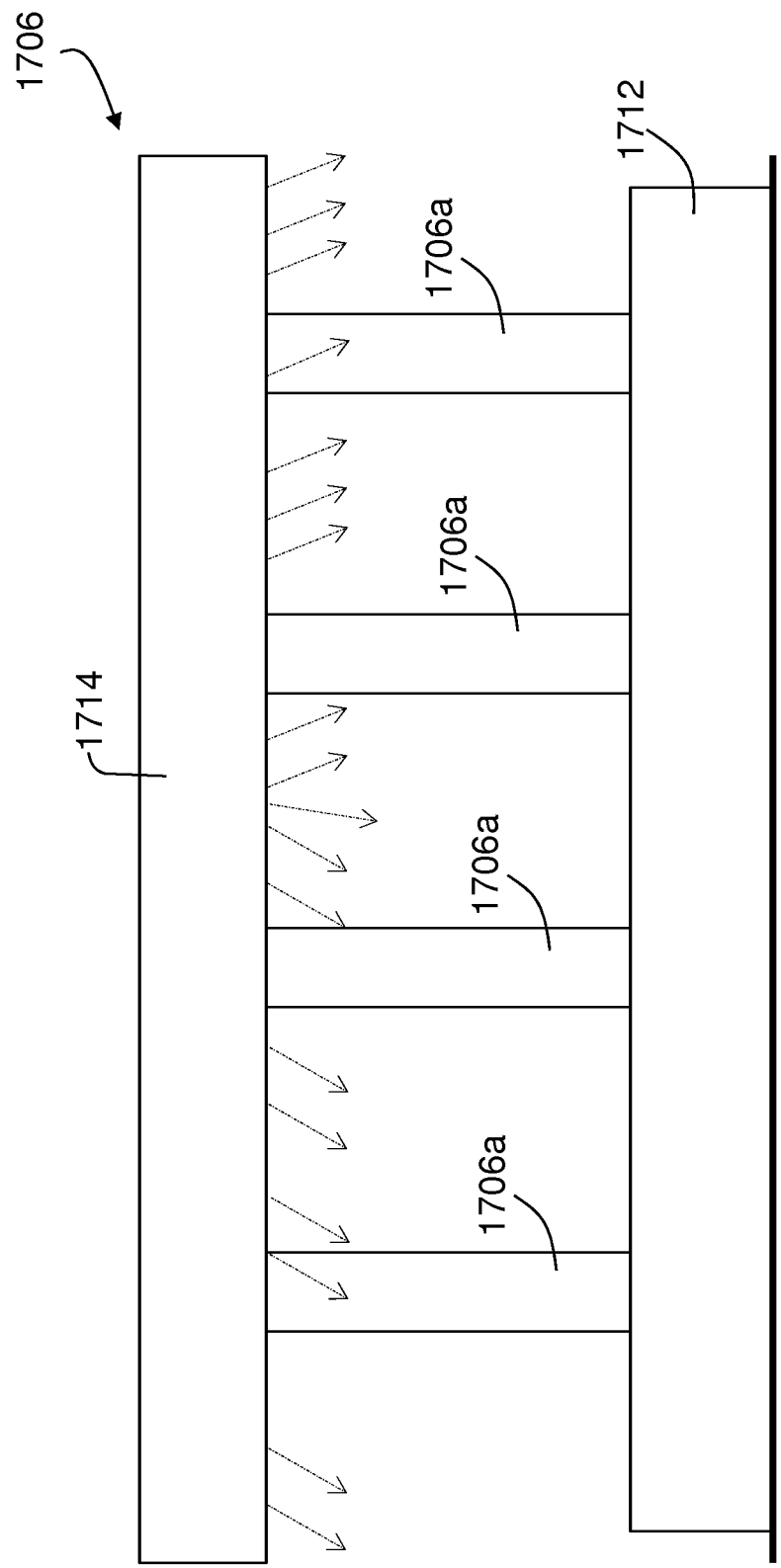
FIG. 17B is a side elevation view of a cooling unit that may be part of the cooling system of FIG. 17A.

For example, turning now to FIGS. 17A-17B, a cooling system 1700 in accordance with an embodiment of the present disclosure is shown. The cooling system 1700, as shown in FIG. 17A, includes a plurality of cooling units 1702, 1704, 1706, 1708 that can be operated to generate a cooled area 1710. FIG. 17B is a side elevation view of one of the cooling units 1706. The cooling units 1702, 1704, 1706, 1708 of the present embodiment include one or more bases (e.g., base 1712 shown in FIG. 17B), a plurality of cooling towers 1702a, 1704a, 1706a, 1708a, and a shared or single air distribution system (e.g., air distribution system 1714 shown in FIG. 17B).

Thus, in such arrangements, a number of cooling towers 1702a, 1704a, 1706a, 1708a can be arranged to supply cool, moist air to a larger air distribution system and thus generate a much larger cooled area as compared to the singular units described above. Further, in some arrangements, the cooling tower can be arranged as a cooling wall (e.g., cooling unit 1704), which may be an extended cooling tower that spans the air distribution system of the large cooling unit.

As described herein, individual cooling units are provided that can generate a cool air region or area around the cooling unit. In accordance with various embodiments of the present disclosure, the cooling units can be modular or separable into the different components. For example, the base, the cooling tower, and the air distribution system can all be physically separated for transportation and ease of installation. Further, such modularity enables delivering and providing cooled air in areas that typically may not be able to have cooled air.

Advantageously, embodiments provided herein can employ photovoltaic solar panels and energy storage batteries for self-sufficient power. As such, the cooling units of the present disclosure can be energy neutral or energy positive (e.g., through use of energy generation and hot water generation). Further, advantageously, the air distribution system of cooling units of the present disclosure can provide shade or shadow to the cooled area immediately around the cooling unit and, as noted above, can provide any required electrical energy to operate cooling unit.

Further, advantageously, the air management systems of cooling units described herein can provide cold saturated air streams due to heat and mass exchange between the air and the cold waterfall that is formed on the cooling tower. Further, dividing the output conditioned air can enables a cold and saturated portion of air which can be injected to a comfort zone in the vicinity of the cooling unit (e.g., from the first subchamber). Further, the air that passes through the second subchamber can provide cooling for solar panels which are installed on the exterior surface of the air distribution system. Advantageously, such cooling can increase solar panel effectiveness. Such air will become warm and dry (e.g., reheating). The two separate streams, once mixed after exiting the air distribution system, can have a temperature and humidity which provides optimized comfort for persons within the cooled air area around the cooling unit.

Further, the two mixed air streams can provide an air curtain function which will create a comfortable zone for people in cooled area.

Further, cold water management functionality can be contained within the cooling unit and can include a small modular water-cooled chiller, and a cold-water pumping, spraying, and delivery system, as described above. Hot water management functionality can include a heat rejection system which will be connected to a heat evacuation network (e.g., heat rejection system). Advantageously, evacuated heat may be reused for various purposes, including sanitary hot water, or can be rejected to ambient air with a dry cooler or cooling tower that is remote from the cooling units.

Advantageously, the cooling units of the present disclosure can be powered with solar energy and be "green." Further, advantageously, the cooling units of the present disclosure can be modular and can be easily reconfigured based on various requirements (e.g., customer requirements, geography, available space, available water supplies, etc.).

Further, advantageously, the cooling units of the present disclosure can be configured in various geometric or aesthetic designs. That is, although shown and described as an umbrella shape, in accordance with various embodiments, the cooling units can be designed in such way that it is incorporated in an aesthetic manner relative to a location in which it is installed. For example, the cooling tower and air distribution system can be shaped into the form of a palm tree, an umbrella, or other architectural form. In the example of a palm or other tree configuration, the air dispensers can be configured at the ends of "branches" or "leaves" and the subchambers can be within the "branches" or "leaves." Thus, the above description and illustrations are not intended to be limiting.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A cooling unit comprising:
   a base having a housing with control components installed therein;
   a cooling tower attached to the base at a first end of the cooling tower, the cooling tower having an inner flow path and an exterior surface; and an air distribution system attached to the cooling tower at a second end of the cooling tower, the air distribution system including:
- a first enclosure;
- a second enclosure defining an air distribution chamber between the first and second enclosures;
- a cool air dispenser configured in the first enclosure;
- a warm air dispenser configured in the first enclosure at a location different from the cool air dispenser; and
- a cover disposed on an exterior surface of the second enclosure, wherein the control components are configured to convey air through the base, the cooling tower, and the air distribution system to dispense air through the cool air dispenser and the warm air dispenser;

a plurality of ducts connecting the cooling tower to each of the cool air dispenser and the warm air dispenser; and a ducting supply chamber arranged at the top of the cooling tower and located within the air distribution chamber of the air distribution system, wherein the plurality of ducts are connected between the ducting supply chamber and each of the cool air dispenser and the warm air dispenser.

2. The cooling unit of claim 1, wherein the plurality of ducts are connected to a diffuser chamber that encompasses the cool air dispenser and the warm air dispenser.

3. The cooling unit of claim 1, wherein a plurality of first ducts of the plurality of ducts connect the ducting supply chamber to the cool air dispenser and a plurality of second ducts of the plurality of ducts connect the ducting supply chamber to the warm air dispenser.

4. The cooling unit of claim 1, further comprising a cooling unit water supply configured to supply water to the cooling tower to cool air passing through the cooling tower.

5. The cooling unit of claim 1, further comprising a thermal insulating layer applied to the air distribution system.

6. The cooling unit of claim 1, further comprising an electronics package.

7. The cooling unit of claim 6, wherein the electronics package includes at least one of a camera, a display, and a speaker.

8. The cooling unit of claim 4, further comprising a water treatment module fluidly connected to the cooling unit water supply to treat the water of the cooling unit water supply.

9. The cooling unit of claim 4, wherein the cooling unit water supply is configured to provide water droplets to an interior of the cooling tower.

10. The cooling unit of claim 4, wherein the cooling unit water supply is configured to provide exterior cool water to an exterior surface of the cooling tower.

11. The cooling unit of claim 4, wherein the cooling unit water supply is configured to provide water droplets through an interior of the cooling tower and exterior cool water to an exterior surface of the cooling tower.

12. The cooling unit of claim 4, wherein the cooling unit water supply is fluidly connected to the air distribution system through a cooling unit water supply line to supply water to the air distribution system.

13. The cooling unit of claim 12, wherein the cooling unit water supply line is arranged within the cooling tower.

14. The cooling unit of claim 12, further comprising a pump configured to pump water from the cooling unit water supply through the cooling unit water supply line to the air distribution system.

15. The cooling unit of claim 12, further comprising a water dispenser arranged within the air distribution system and configured to at least one of direct water droplets into an interior of the cooling tower and direct water droplets on an exterior of the cooling tower.

* * * * *